United States Patent  
Nitta et al.

(10) Patent No.: US 12,091,491 B2  
(45) Date of Patent: Sep. 17, 2024

(54) SILYLAMINE COMPOUND AND LATENT CURING AGENT COMPRISING SAID SILYLAMINE COMPOUND

(71) Applicant: KOEI CHEMICAL COMPANY, LIMITED, Sodegaura (JP)

(72) Inventors: Shingo Nitta, Sodegaura (JP); Motoyoshi Miyagi, Sodegaura (JP); Masakazu Kikuchi, Kasumigaura (JP)

(73) Assignee: KOEI CHEMICAL COMPANY, LIMITED, Sodegaura (JP)

(*) Notice: Subject to any disclaimer, the term of this patent is extended or adjusted under 35 U.S.C. 154(b) by 797 days.

(21) Appl. No.: 17/284,857

(22) PCT Filed: Oct. 31, 2019

(86) PCT No.: PCT/JP2019/042730  
§ 371 (c)(1),  
(2) Date: Apr. 13, 2021

(87) PCT Pub. No.: WO2020/090960  
PCT Pub. Date: May 7, 2020

(65) Prior Publication Data  
US 2022/0119583 A1    Apr. 21, 2022

(30) Foreign Application Priority Data

Oct. 31, 2018  (JP) ................................. 2018-205205  
Oct. 31, 2018  (JP) ................................. 2018-205211

(51) Int. Cl.  
*C08G 18/06* (2006.01)  
*C07F 7/10* (2006.01)  
*C08G 18/12* (2006.01)  
*C08G 18/75* (2006.01)

(52) U.S. Cl.  
CPC ............. *C08G 18/755* (2013.01); *C07F 7/10* (2013.01); *C08G 18/12* (2013.01)

(58) Field of Classification Search  
None  
See application file for complete search history.

(56) References Cited

U.S. PATENT DOCUMENTS 4,433,127 A     2/1984  Sugiyama et al.  
2019/0023841 A1*  1/2019  Nonaka .............. C08G 65/3346

FOREIGN PATENT DOCUMENTS

| JP | 07-278270 A | 10/1995 |
| JP | H09-249727 A | 9/1997 |
| JP | 2013-072016 A | 4/2013 |
| JP | 2016-113619 A | 6/2016 |
| TW | 201207000 A | 2/2012 |
| TW | 201829540 A | 8/2018 |

OTHER PUBLICATIONS

International Search Report w/English translation and Written Opinion in Japanese dated Dec. 17, 2019, issued in counterpart International Application No. PCT/JP2019/042730 (8 pages).  
Storey et al., "Bioabsorbable Composites. II: Nontoxic, L-lysine-Based Poly(ester-urethane) Matrix Composites", Polymer Composites, Feb. 1993, vol. 14, No. 1, pp. 17-25, cited in ISR (9 pages).  
International Preliminary Report on Patentability (Form PCT/IB/373) issued in counterpart International Application No. PCT/JP2019/042730 dated Apr. 27, 2021, with Form PCT/ISA/237, with English translation. (9 pages).  
Office Action dated Mar. 29, 2023, issued in counterpart TW Application No. 108139455 (5 pages).  
Extended (Supplementary) European Search Report dated Jun. 13, 2022, issued in counterpart EP application No. 19879714.4. (6 pages).

* cited by examiner

*Primary Examiner* — Michael J Feely  
(74) *Attorney, Agent, or Firm* — WHDA, LLP

(57) ABSTRACT

An object of the present invention is to provide a compound suitable for use as a latent curing agent, which does not produce an aldehyde compound when caused to react with an isocyanate compound. The present invention provides, as the compound, a silylamine compound represented by the following formula (1):

$$\text{(1)}$$

in the formula (1), $R^1$ to $R^{12}$ each independently represent an alkyl group having 1 to 6 carbon atoms, $R^{13}$ represents an alkylene group having 2 to 12 carbon atoms or an arylene group having 6 to 12 carbon atoms, $R^{14}$ to $R^{21}$ each independently represent a hydrogen atom or an alkyl group having 1 to 6 carbon atoms, "y" and "z" each independently represent an integer of from 1 to 11, and "n" represents an integer of from 1 to 43.

11 Claims, No Drawings

SILYLAMINE COMPOUND AND LATENT CURING AGENT COMPRISING SAID SILYLAMINE COMPOUND

TECHNICAL FIELD

The present invention relates to a silylamine compound and a latent curing agent including the silylamine compound.

BACKGROUND ART

A curable composition containing an isocyanate group-containing urethane prepolymer has been used in applications such as a sealing material and an adhesive. The curable composition containing an isocyanate group-containing urethane prepolymer is classified into a one-component type that contains an isocyanate group-containing urethane prepolymer and a latent curing agent and is allowed to react with water in air to be cured and a two-component type in which a base compound containing an isocyanate group-containing urethane prepolymer and a curing agent containing an active hydrogen-containing compound are mixed to be cured at the time of use.

The one-component type curable composition containing the isocyanate group-containing urethane prepolymer is a paste-like or viscous solution-like material containing the isocyanate group-containing urethane prepolymer and the latent curing agent, and is used in, for example, a sealing material, a waterproofing material, an adhesive, or a paint. In general, performances that the latent curing agent is required to have include storage stability, a curing property, and compatibility with the prepolymer.

An oxazolidine-based latent curing agent obtained by protecting an amine compound, such as a bisalkanolamine, with an aldehyde compound, such as isobutyraldehyde, has been known as the latent curing agent (Patent Literature 1).

The oxazolidine-based latent curing agent is hydrolyzed to become an aminoethanol derivative, and the derivative reacts with an isocyanate group of the urethane prepolymer to cure the curable composition. However, the aldehyde compound is produced at the time of the hydrolysis of the oxazolidine-based latent curing agent, and hence its odor and toxicity become problems (reaction formula 1).

Reaction formula 1

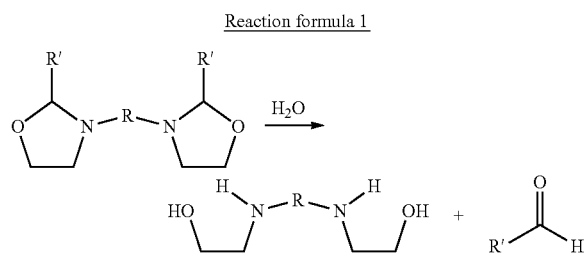

CITATION LIST

Patent Literature

PTL 1: Japanese Patent Application Laid-Open No. 2016-113619

SUMMARY OF INVENTION

Technical Problem

The present invention has been made in view of the above-mentioned background art, and an object of the present invention is to provide a compound suitable for use as a latent curing agent, which does not produce an aldehyde compound when caused to react with an isocyanate compound.

Solution to Problem

The inventors of the present invention have found that a silylamine compound represented by the formula (1) does not produce an aldehyde compound when hydrolyzed, and have found that an amino group produced by the hydrolysis reacts with an isocyanate compound to enable the silylamine compound to function as a latent curing agent. Thus, the inventors have completed the present invention.

That is, one embodiment of the present invention relates to a silylamine compound represented by the following formula (1).

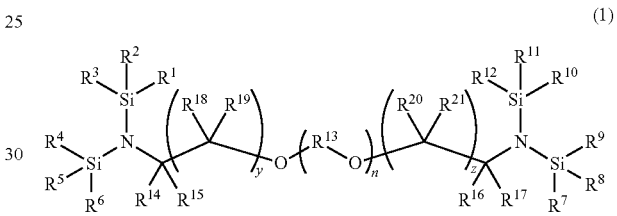

(1)

In the formula (1), $R^1$ to $R^{12}$ each independently represent an alkyl group having 1 to 6 carbon atoms, $R^{13}$ represents an alkylene group having 2 to 12 carbon atoms or an arylene group having 6 to 12 carbon atoms, $R^{14}$ to $R^{21}$ each independently represent a hydrogen atom or an alkyl group having 1 to 6 carbon atoms, "y" and "z" each independently represent an integer of from 1 to 11, and "n" represents an integer of from 1 to 43.

In addition, one embodiment of the present invention relates to a latent curing agent including a silylamine compound represented by the following formula (1).

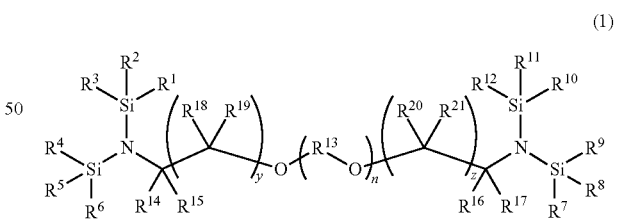

(1)

In the formula (1), $R^1$ to $R^{12}$ each independently represent an alkyl group having 1 to 6 carbon atoms, $R^{13}$ represents an alkylene group having 2 to 12 carbon atoms or an arylene group having 6 to 12 carbon atoms, $R^{14}$ to $R^{21}$ each independently represent a hydrogen atom or an alkyl group having 1 to 6 carbon atoms, "y" and "z" each independently represent an integer of from 1 to 11, and "n" represents an integer of from 1 to 22.

Further, one embodiment of the present invention relates to a curable composition including a latent curing agent including a silylamine compound represented by the following formula (1).

(1)

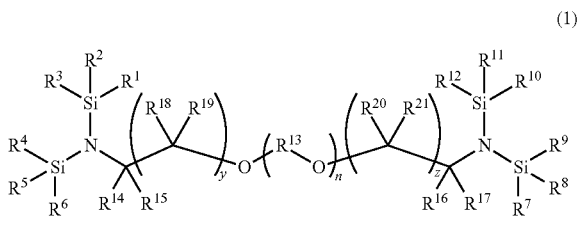

In the formula (1), $R^1$ to $R^{12}$ each independently represent an alkyl group having 1 to 6 carbon atoms, $R^{13}$ represents an alkylene group having 2 to 12 carbon atoms or an arylene group having 6 to 12 carbon atoms, $R^{14}$ to $R^{21}$ each independently represent a hydrogen atom or an alkyl group having 1 to 6 carbon atoms, "y" and "z" each independently represent an integer of from 1 to 11, and "n" represents an integer of from 1 to 22.

Still further, one embodiment of the present invention relates to a use of a silylamine compound represented by the following formula (1) as a latent curing agent.

(1)

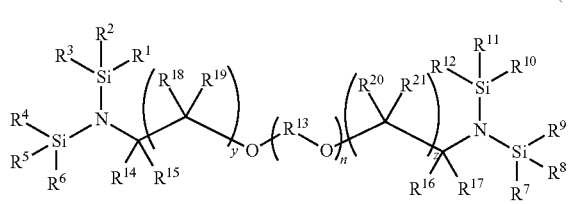

In the formula (1), $R^1$ to $R^{12}$ each independently represent an alkyl group having 1 to 6 carbon atoms, $R^{13}$ represents an alkylene group having 2 to 12 carbon atoms or an arylene group having 6 to 12 carbon atoms, $R^{14}$ to $R^{21}$ each independently represent a hydrogen atom or an alkyl group having 1 to 6 carbon atoms, "y" and "z" each independently represent an integer of from 1 to 11, and "n" represents an integer of from 1 to 22.

Advantageous Effects of Invention

The silylamine compound of the present invention does not produce an aldehyde compound even when hydrolyzed by water. Accordingly, the silylamine compound of the present invention can be used as a latent curing agent that does not produce the odor of the aldehyde compound when caused to react with an isocyanate compound. Further, the silylamine compound of the present invention can be used as a latent curing agent. Further, the silylamine compound of the present invention is excellent in storage stability when used as a latent curing agent, and when an isocyanate compound is used as a prepolymer, the silylamine compound is excellent in compatibility with the prepolymer.

DESCRIPTION OF EMBODIMENTS

A mode for carrying out the present invention is described in detail below.

According to one embodiment of the present invention, there is provided a silylamine compound represented by the following formula (1).

(1)

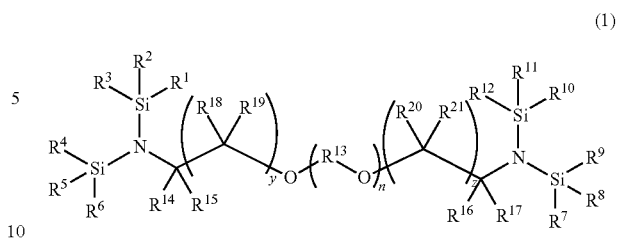

In the formula (1), $R^1$ to $R^{12}$ each independently represent an alkyl group having 1 to 6 carbon atoms. The alkyl group having 1 to 6 carbon atoms may be linear or branched. Examples of the alkyl group having 1 to 6 carbon atoms include a methyl group, an ethyl group, a propyl group, a butyl group, a pentyl group, and a hexyl group. Of those, a methyl group, an ethyl group, a propyl group, or a butyl group is preferred, a methyl group or an ethyl group is more preferred, and a methyl group is particularly preferred.

$R^{13}$ represents an alkylene group having 2 to 12 carbon atoms or an arylene group having 6 to 12 carbon atoms, preferably an alkylene group having 2 to 12 carbon atoms.

The alkylene group having 2 to 12 carbon atoms may be linear or branched. Examples of the alkylene group having 2 to 12 carbon atoms include an ethylene group, a propylene group, a butylene group, a pentylene group, a hexylene group, a heptylene group, an octylene group, a nonylene group, a decylene group, an undecylene group, and a dodecylene group. Of those, an ethylene group, a propylene group, a butylene group, a pentylene group, or a hexylene group is preferred, and an ethylene group, a propylene group, or a butylene group is more preferred.

Examples of the arylene group having 6 to 12 carbon atoms include a phenylene group and a naphthylene group.

$R^{14}$ to $R^{21}$ each independently represent a hydrogen atom or an alkyl group having 1 to 6 carbon atoms, preferably a hydrogen atom. Examples of the alkyl group having 1 to 6 carbon atoms include the same groups as those described above.

"y" and "z" each independently represent an integer of from 1 to 11, preferably an integer of from 1 to 3, more preferably 1 or 2.

"n" represents an integer of from 1 to 43, preferably an integer of from 1 to 22, more preferably an integer of from 1 to 18, still more preferably an integer of from 1 to 14, particularly preferably an integer of from 1 to 5.

In addition, as one embodiment of the present invention, when the silylamine compound represented by the formula (1) is used as a latent curing agent, "n" represents an integer of from 1 to 22, preferably an integer of from 1 to 18, more preferably an integer of from 1 to 14, still more preferably an integer of from 1 to 5.

Specific examples of the silylamine compound represented by the formula (1) (hereinafter referred to as "silylamine compound (1)") include N,N,N',N'-tetrakis(trimethylsilyl)-4,9-dioxa-1,12-dodecanediamine, N,N,N',N'-tetrakis(trimethylsilyl)-3,6-dioxa-1,8-octanediamine, N,N,N',N'-tetrakis(trimethylsilyl)-4,7-dioxa-1,10-decanediamine, N,N,N',N'-tetrakis(trimethylsilyl)-4,7,10-trioxa-1,13-tridecanediamine, N,N,N',N'-tetrakis(trimethylsilyl)-4,7,10,13-tetraoxa-1,16-hexadecanediamine, N,N,N',N'-tetrakis(trimethylsilyl)-4,7,10,13,16-pentaoxa-1,19-nonadecanediamine, N,N,N',N'-tetrakis(trimethylsilyl)-3,6,9-trioxa-1,11-undecanediamine, N,N,N',N'-tetrakis(trimethylsilyl)-3,6,9,12-tetraoxa-1,14-tetradecanediamine, N,N,N',N'-tetrakis(trimethylsilyl)-3,6,9,12,15-pentaoxa-1, 17-heptadecanediamine, N,N,N',N'-tetrakis(trimethylsilyl)-3,6-dioxa-1,9-nonanediamine, N,N,N',N'-tetrakis(trimethylsilyl)-3,6,9-trioxa-1,12-dodecanediamine, N,N,N',N'-tetrakis(trimethylsilyl)-3,6,9,12-tetraoxa-1,15-pentadecanediamine, N,N,N',N'-tetrakis(trimethylsilyl)-3,6,9,12,15-pentaoxa-1,18-octadecanediamine, N,N,N',N'-tetrakis(trimethylsilyl)-3,8-dioxa-1,10-decanediamine, N,N,N',N'-tetrakis(trimethylsilyl)-3,8-dioxa-1,11-undecanediamine, N,N,N',N'-tetrakis(trimethylsilyl)-polyoxyethylene bisamine, and N,N,N',N'-tetrakis(trimethylsilyl)-polyoxypropylene bisamine. Those compounds may be used alone or in combination thereof. Of those, N,N,N',N'-tetrakis(trimethylsilyl)-4,9-dioxa-1,12-dodecanediamine, N,N,N',N'-tetrakis(trimethylsilyl)-3,6-dioxa-1,8-octanediamine, N,N,N',N'-tetrakis(trimethylsilyl)-4,7-dioxa-1,10-decanediamine, and N,N,N',N'-tetrakis(trimethylsilyl)-4,7,10-trioxa-1,13-tridecanediamine are preferred.

The silylamine compound (1) may be produced by causing an amine compound represented by the following formula (2) (hereinafter referred to as "amine compound (2)") and a silane compound represented by any one of the following formulae (3a) to (3d) (hereinafter referred to as "silane compound (3)") to react with each other.

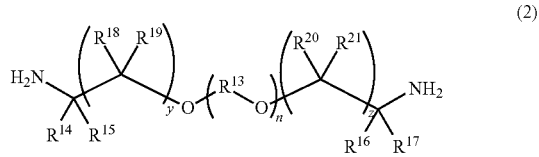

(2)

In the formula (2), $R^{13}$ to $R^{21}$, "y", "z", and "n" are identical to $R^{13}$ to $R^{21}$, "y", "z", and "n" represented in the formula (1), respectively.

X—SiR¹R²R³ (3a)

X—SiR⁴R⁵R⁶ (3b)

X—SiR⁷R⁸R⁹ (3c)

X—SiR¹⁰R¹¹R¹² (3d)

In the formulae (3a) to (3d), $R^1$ to $R^{12}$ are identical to $R^1$ to $R^{12}$ represented in the formula (1), respectively. In addition, X represents a group selected from the group consisting of a chlorine atom, a bromine atom, an iodine atom, an alkylsulfonyloxy group, a perfluoroalkylsulfonyloxy group, an arylsulfonyloxy group, a perfluoroarylsulfonyloxy group, an aralkylsulfonyloxy group, a silylsulfuric acid group, and a bisperfluoroalkylsulfonylimide group.

The amine compound (2) is described.

Specific examples of the amine compound (2) include 4,9-dioxa-1,12-dodecanediamine, 3,6-dioxa-1,8-octanediamine, 4,7-dioxa-1,10-decanediamine, 4,7,10-trioxa-1,13-tridecanediamine, 4,7,10,13-tetraoxa-1,16-hexadecanediamine, 4,7,10,13,16-pentaoxa-1,19-nonadecanediamine, 3,6,9-trioxa-1,11-undecanediamine, 3,6,9,12-tetraoxa-1,14-tetradecanediamine, 3,6,9,12,15-pentaoxa-1,17-heptadecanediamine, 3,6-dioxa-1,9-nonanediamine, 3,6,9-trioxa-1,12-dodecanediamine, 3,6,9,12-tetraoxa-1,15-pentadecanediamine, 3,6,9,12,15-pentaoxa-1,18-octadecanediamine, 3,8-dioxa-1,10-decanediamine, 3,8-dioxa-1,11-undecanediamine, polyoxyethylene bisamine, and polyoxypropylene bisamine. Of those, 4,9-dioxa-1,12-dodecanediamine, 3,6-dioxa-1,8-octanediamine, 4,7-dioxa-1,10-decanediamine, and 4,7,10-trioxa-1,13-tridecanediamine are preferred.

Although a compound that is generally available may be used as the amine compound (2), a compound that is appropriately produced may be used. Typical production methods for the amine compound (2) include the following methods: a method including causing a diol compound represented by the following formula (4) and a phosphorus halide, a triphenylphosphine-carbon tetrahalide, or the like to react with each other to convert a terminal hydroxyl group of the diol compound into a halogen atom, then causing a metal azide to react with the atom to turn the atom into an azide group, and further reducing the azide group; a method including turning the terminal hydroxyl group of the diol compound represented by the following formula (4) into a halogen atom, then causing a metal cyanide to react with the atom to turn the atom into a cyano group, and further reducing the cyano group; a method including converting the terminal hydroxyl group of the diol compound represented by the following formula (4) into a halogen atom, and then causing the atom to react with a phthalimide metal salt to further convert the atom into an imide group, followed by deprotection; and a production method including the following steps 1 and 2.

The amine compound (2) produced by the production method including the following steps 1 and 2 is an amine compound represented by the formula (2a) (hereinafter referred to as "amine compound (2a)").

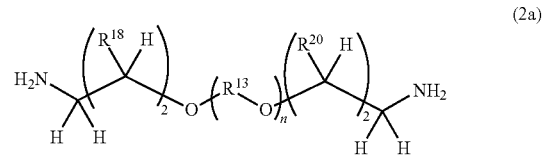

(2a)

The amine compound (2a) is a compound out of the amine compounds represented by the formula (2) in which $R^{14}$ to $R^{17}$, $R^{19}$, and $R^{21}$ each represent a hydrogen atom, and "y" and "z" each represent 2.

Step 1

The step 1 is a step of causing the diol compound represented by the following formula (4) (hereinafter referred to as "diol compound (4)") and an olefin cyanide compound represented by the following formula (5) (hereinafter referred to as "olefin cyanide compound (5)") to react with each other to provide a nitrile compound represented by the following formula (6) (hereinafter referred to as "nitrile compound (6)").

(4)

In the formula (4), $R^{13}$ and "n" are identical to $R^{13}$ and "n" represented in the formula (1), respectively. Specific examples of the diol compound (4) include 1,4-butanediol, 1,6-hexanediol, ethylene glycol, propylene glycol, diethylene glycol, triethylene glycol, tetraethylene glycol, pentaethylene glycol, hexaethylene glycol, 1,2-propylene glycol, 1,3-propylene glycol, dipropylene glycol, 1,5-pentanediol, 1,6-hexanediol, 1,7-heptanediol, 1,8-octanediol, 1,9- nonanediol, 3-methyl-1,5-pentanediol, polyoxyethylene glycol, and polypropylene glycol.

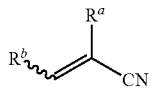
(5)

In the formula (5), $R^a$ and Rb correspond to $R^{18}$ and $R^{20}$ represented in the formula (1), respectively, and each independently represent a hydrogen atom or an alkyl group having 1 to 6 carbon atoms.

Specific examples of the olefin cyanide compound (5) include acrylonitrile, methacrylonitrile, crotonitrile, and 2-pentenenitrile.

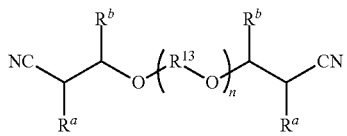
(6)

where $R^{13}$ and "n" are identical to $R^{13}$ and "n" represented in the formula (1), respectively, and $R^a$ and Rb are identical to $R^a$ and Rb represented in the formula (5), respectively.

The step 1 is described.

The reaction between the diol compound (4) and the olefin cyanide compound (5) in the step 1 is typically performed in the presence of a base. The usage amount of the olefin cyanide compound (5) is typically from 2 mol to 4 mol, preferably from 2 mol to 3 mol with respect to 1 mol of the diol compound (4).

The base is not particularly limited as long as the base does not react with a solvent or the olefin cyanide compound (5). Examples of the base to be used include an alkali metal hydroxide, an alkali metal carbonate, an amidine compound, a guanidine compound, and an aniline compound. Of those, an alkali metal hydroxide is preferred.

Examples of the alkali metal hydroxide include lithium hydroxide, sodium hydroxide, and potassium hydroxide. Of those, sodium hydroxide is preferred. Examples of the alkali metal carbonate include sodium carbonate, potassium carbonate, and cesium carbonate. Examples of the amidine compound include 1,8-diazabicyclo[5.4.0]-7-undecene and 1,5-diazabicyclo[4.3.0]-5-nonene. An example of the guanidine compound is 1,5,7-triazabicyclo[4.4.0]deca-5-ene. An example of the aniline compound is 1,8-bis(dimethylamino)naphthalene.

Although the reaction of the step 1 may be performed in the absence of any solvent, a solvent may be used as required. When the solvent is used, the solvent is not particularly limited as long as the solvent does not inhibit the reaction. Examples of the solvent include an ether solvent and an aromatic hydrocarbon solvent. Of those, an ether solvent is preferred. Examples of the ether solvent include diethyl ether, diisopropyl ether, tetrahydrofuran, and 1,4-dioxane. Of those, tetrahydrofuran is preferred. Examples of the aromatic hydrocarbon solvent include benzene, toluene, and xylene. In addition, when the alkali metal hydroxide, the alkali metal carbonate, or the like is used as the base, water may be added for dissolving the base.

When the solvent is used, the usage amount of the solvent only needs to be appropriately regulated. For example, the usage amount is generally from 1 part by mass to 10 parts by mass, preferably from 1 part by mass to 4 parts by mass with respect to 1 part by mass of the diol compound (4).

A reaction pressure is not particularly limited, and the reaction may be performed at normal pressure, or the reaction may be performed under pressure.

A reaction temperature, which is not particularly limited, is typically from 0° C. to 100° C., preferably from 10° C. to 50° C., more preferably from 25° C. to 30° C.

The order in which the diol compound (4), the olefin cyanide compound (5), the solvent, and the base are mixed is not particularly limited, and for example, a method including dropping the olefin cyanide compound (5) into a mixture of the solvent, the diol compound (4), and the base is available.

After the completion of the reaction, the target nitrile compound (6) may be isolated through a known purifying operation, such as distillation, filtration, or extraction. In addition, the reaction product may be subjected to the step 2 without isolation of the nitrile compound (6).

Step 2

The step 2 is a step of causing a metal hydride (hereinafter referred to as "metal hydride (7)") to react with the nitrile compound (6) to provide the amine compound (2a).

The step 2 is described.

Examples of the metal hydride (7) include lithium aluminum hydride, lithium borohydride, sodium borohydride, diisobutylaluminum hydride, lithium triethylborohydride, sodium bis(2-methoxyethoxy)aluminum hydride, and tetrahydroborane. Of those, lithium aluminum hydride, sodium borohydride, and tetrahydroborane are preferred, and sodium borohydride is more preferred.

The usage amount of the metal hydride (7) only needs to be appropriately regulated, and is generally from 9 mol to 30 mol, preferably from 9 mol to 18 mol with respect to 1 mol of the nitrile compound (6).

Although the reaction of the step 2 may be performed in the absence of any catalyst, a catalyst may be used as required. When the catalyst is used, examples of the catalyst include nickel chloride hexahydrate and cobalt chloride. Of those, nickel chloride hexahydrate is preferred.

When the catalyst is used, the usage amount of the catalyst is typically from 0.1 mol to 9 mol, preferably from 0.1 mol to 0.5 mol with respect to 1 mol of the nitrile compound (6).

The reaction of the step 2 is typically performed in the presence of a solvent. The solvent is not particularly limited as long as the solvent does not inhibit the reaction. Examples of the solvent to be used include: an alcohol solvent, such as methanol or ethanol; an ether solvent, such as diethyl ether, diisopropyl ether, tetrahydrofuran, or 1,4-dioxane; and an aromatic hydrocarbon solvent, such as benzene, toluene, or xylene. Of those, an alcohol solvent is preferred, and methanol is more preferred.

The usage amount of the solvent only needs to be appropriately regulated. For example, the usage amount is generally from 10 parts by mass to 50 parts by mass, preferably from 10 parts by mass to 20 parts by mass, more preferably from 12 parts by mass to 15 parts by mass with respect to 1 part by mass of the nitrile compound (6).

In the reaction of the step 2, di-t-butyl dicarbonate may be further used for the purposes of reducing the amount of the catalyst and suppressing the dimerization reaction of the amine compound (2a). When di-t-butyl dicarbonate is used, the usage amount of di-t-butyl dicarbonate only needs to be appropriately regulated. For example, the usage amount is generally from 2 mol to 8 mol, preferably from 3 mol to 6 mol, more preferably from 4 mol to 5 mol with respect to 1 mol of the nitrile compound (6).

After the completion of the reaction, the amine compound (2a) may be isolated through a known operation such as deprotection, distillation, filtration, or extraction. When di-t-butyl dicarbonate is used in the reaction of the step 2, the terminal amino groups of the amine compound (2a) are each in a state of being protected with a t-butoxycarbonyl group, and hence the amine compound (2a) can be obtained by deprotecting the groups with an acid or the like.

The silane compound (3) is described.

Examples of the alkylsulfonyloxy group represented by X in each of the formulae (3a) to (3d) include a methanesulfonyloxy group, an ethanesulfonyloxy group, a propanesulfonyloxy group, a butanesulfonyloxy group, a pentanesulfonyloxy group, and a hexanesulfonyloxy group. Of those, a methanesulfonyloxy group, an ethanesulfonyloxy group, a propanesulfonyloxy group, and a butanesulfonyloxy group are preferred, and a methanesulfonyloxy group is more preferred.

Examples of the perfluoroalkylsulfonyloxy group represented by X in each of the formulae (3a) to (3d) include a trifluoromethanesulfonyloxy group, a pentafluoroethanesulfonyloxy group, a heptafluoropropanesulfonyloxy group, a nonafluorobutanesulfonyloxy group, an undecafluoropentanesulfonyloxy group, and a tridecafluorohexanesulfonyloxy group. Of those, a trifluoromethanesulfonyloxy group, a pentafluoroethanesulfonyloxy group, a heptafluoropropanesulfonyloxy group, and a nonafluorobutanesulfonyloxy group are preferred, and a trifluoromethanesulfonyloxy group is more preferred.

Examples of the arylsulfonyloxy group represented by X in each of the formula (3a) to (3d) include a benzenesulfonyloxy group, a 2-chlorobenzenesulfonyloxy group, a 2-bromobenzenesulfonyloxy group, a 2-iodobenzenesulfonyloxy group, a 2-methylbenzenesulfonyloxy group, a 2-nitrobenzenesulfonyloxy group, a 3-chlorobenzenesulfonyloxy group, a 3-bromobenzenesulfonyloxy group, a 3-iodobenzenesulfonyloxy group, a 3-methylbenzenesulfonyloxy group, a 3-nitrobenzenesulfonyloxy group, a 4-chlorobenzenesulfonyloxy group, a 4 bromobenzenesulfonyloxy group, a 4-iodobenzenesulfonyloxy group, a 4-methylbenzenesulfonyloxy group, a 4 nitrobenzenesulfonyloxy group, a 1-naphthalenesulfonyloxy group, and a 2-naphthalenesulfonyloxy group. Of those, a benzenesulfonyloxy group and a 4-methylbenzenesulfonyloxy group are preferred, and a 4-methylbenzenesulfonyloxy group is more preferred.

Examples of the perfluoroarylsulfonyloxy group represented by X in each of the formulae (3a) to (3d) include a pentafluorobenzenesulfonyloxy group, a heptafluoro-1-naphthalenesulfonyloxy group, and a heptafluoro-2-naphthalenesulfonyloxy group. Of those, a pentafluorobenzenesulfonyloxy group and a heptafluoro-1-naphthalenesulfonyloxy group are preferred, and a pentafluorobenzenesulfonyloxy group is more preferred.

Examples of the aralkylsulfonyloxy group represented by X in each of the formulae (3a) to (3d) include a benzylsulfonyloxy group, a phenethylsulfonyloxy group, a 1-naphthylsulfonyloxy group, and a 2-naphthylsulfonyloxy group. Of those, a pentafluorobenzenesulfonyloxy group, a benzylsulfonyloxy group, and a phenethylsulfonyloxy group are preferred, and a pentafluorobenzenesulfonyloxy group is more preferred.

Examples of the silylsulfuric acid group represented by X in each of the formulae (3a) to (3d) include a trimethylsilylsulfuric acid group, a triethylsilylsulfuric acid group, a triisopropylsulfuric acid group, and a tert-butyldimethylsilylsulfuric acid group. Of those, a trimethylsilylsulfuric acid group, a triethylsilylsulfuric acid group, a triisopropylsulfuric acid group, and a tert-butyldimethylsilylsulfuric acid group are preferred, and a trimethylsilylsulfuric acid group is more preferred.

Examples of the bisperfluoroalkylsulfonylimide group represented by X in each of the formulae (3a) to (3d) include a bistrifluoromethanesulfonylimide group, a bispentafluoroethanesulfonylimide group, a bisheptafluoropropanesulfonylimide group, a bisnonafluorobutanesulfonylimide group, a bisundecafluoropentanesulfonylimide group, and a bistridecafluorohexanesulfonylimide group. Of those, a bistrifluoromethanesulfonylimide group, a bispentafluoroethanesulfonylimide group, a bisheptafluoropropanesulfonylimide group, and a bisnonafluorobutanesulfonylimide group are preferred, and a bistrifluoromethanesulfonylimide group is more preferred.

In each of the formulae (3a) to (3d), X represents preferably a chlorine atom, a bromine atom, an iodine atom, an alkylsulfonyloxy group, a perfluoroalkylsulfonyloxy group, an arylsulfonyloxy group, or a bisperfluoroalkylsulfonylimide group, more preferably a chlorine atom, a bromine atom, or an iodine atom, particularly preferably a chlorine atom.

Examples of the silane compound (3) include: trimethylsilane compounds, such as chlorotrimethylsilane, bromotrimethylsilane, iodotrimethylsilane, trimethylsilyl trifluoromethanesulfonate, and bis(trimethylsilyl) sulfate; triethylsilane compounds, such as chlorotriethylsilane, bromotriethylsilane, iodotriethylsilane, triethylsilyl trifluoromethanesulfonate, and bis(triethylsilyl) sulfate; and tert-butyldimethylsilyl compounds, such as tert-butyldimethylchlorosilane, tert-butyldimethylbromosilane, tert-butyldimethyliodosilane, and tert-butyldimethylsilyl trifluoromethanesulfonate. Of those, trimethylsilane compounds are preferred, and chlorotrimethylsilane is particularly preferred.

The reaction between the amine compound (2) and the silane compound (3) is typically performed in the presence of a base in order that an acid produced as a by-product by the reaction may be captured. The base is not particularly limited as long as the base does not affect the amine compound (2) and the silane compound (3), and the silylamine compound (1) that is a product of the reaction. Examples of the base to be used include: an amidine compound, such as 1,8-diazabicyclo[5.4.0]-7-undecene or 1,5-diazabicyclo[4.3.0]-5-nonene; a guanidine compound, such as 1,5,7-triazabicyclo[4.4.0]deca-5-ene; an aniline compound, such as 1,8-bis(dimethylamino)naphthalene; a phosphine compound, such as tert-butylimino-tris(dimethylamino)phosphorane or N-tert-butyl-N,N,N',N',N'',N''-hexamethylphosphorimidic triamide; and an amine compound, such as triethylamine or N,N-diisopropylethylamine. Of those, an amidine compound is preferred, and 1,8-diazabicyclo[5.4.0]-7-undecene is particularly preferred. In addition, in the reaction between the amine compound (2) and the silane compound (3), such bases may be used alone or in combination thereof.

The usage amount of the silane compound (3) is generally from 4 mol to 8 mol, preferably from 4 mol to 6 mol with respect to 1 mol of the amine compound (2).

The reaction is typically performed in the presence of a solvent. The solvent is not particularly limited as long as the solvent does not inhibit the reaction. Examples of the solvent to be used include: an ether solvent, such as diethyl ether, diisopropyl ether, tetrahydrofuran, or 1,4-dioxane; an aromatic hydrocarbon solvent, such as benzene, toluene, or xylene; an ester solvent, such as ethyl acetate; a halogenated hydrocarbon solvent, such as dichloromethane, chloroform, or 1,2-dichloroethane; and a nitrile solvent, such as acetonitrile. Of those, a nitrile solvent is preferred, and acetonitrile is more preferred.

The usage amount of the solvent only needs to be appropriately regulated. For example, the usage amount is generally from 1 part by mass to 100 parts by mass, preferably from 3 parts by mass to 6 parts by mass with respect to 1 part by mass of the amine compound (2).

The reaction is preferably performed under an anhydrous condition in order that the hydrolysis of each of the silylamine compound (1) and the silane compound (3) may be prevented. In this case, the reaction may be performed under an inert gas atmosphere, such as nitrogen or argon.

A reaction pressure is not particularly limited, and the reaction may be performed at normal pressure, or the reaction may be performed under pressure.

A reaction temperature, which is not particularly limited, is typically from 0° C. to 100° C., preferably from 0° C. to 50° C., more preferably from 5° C. to 30° C.

The order in which the amine compound (2), the silane compound, the solvent, and the base are mixed is not particularly limited, and for example, a method including dropping the silane compound into a mixture of the solvent, the amine compound (2), and the base is available.

After the completion of the reaction, the target silylamine compound (1) may be isolated through a known purifying operation, such as distillation, filtration, or extraction.

The silylamine compound of the present invention reacts with water such as moisture to be hydrolyzed, thereby producing a primary or secondary amino group. Thus, the compound functions as a latent curing agent at the time of the performance of a reaction with an isocyanate compound or the like. Two or more kinds of the silylamine compounds (1) may be used in combination when the compounds are each used as the latent curing agent.

In addition, when the silylamine compound (1) is used as the latent curing agent, the latent curing agent may contain a solvent as required. When the latent curing agent contains a solvent, the following compounds may each be suitably used as the solvent: pentane, hexane, heptane, octane, cyclohexane, toluene, xylene, ethyl formate, butyl formate, ethyl acetate, butyl acetate, methyl ethyl ketone, acetone, acetonitrile, propionitrile, diethyl ether, dibutyl ether, tetrahydrofuran, and the like.

Further, the latent curing agent including the silylamine compound (1) may be combined with an isocyanate compound to provide a curable composition. The latent curing agent including the silylamine compound (1) is useful because the latent curing agent does not produce an aldehyde compound even when hydrolyzed by water such as moisture, and hence does not produce the odor of the aldehyde compound when caused to react with the isocyanate compound.

When the silylamine compound (1) is turned into the curable composition, its usage amount is typically from 0.4 mol to 1.3 mol, preferably from 0.5 mol to 1.1 mol with respect to 1 mol of an isocyanate group of the isocyanate compound in terms of molar ratio of an amino group produced by the hydrolysis of the silylamine compound (1).

Herein, the isocyanate compound is, for example, a compound having one or more, preferably two or more isocyanate groups. Each of a low-molecular-weight isocyanate compound and a high-molecular-weight isocyanate compound may be used as the isocyanate compound.

Examples of the low-molecular-weight isocyanate compound may include an organic polyisocyanate and an organic monoisocyanate. The organic polyisocyanate is a compound having two or more isocyanate groups therein. In addition, the organic monoisocyanate is a compound having one isocyanate group therein.

Specific examples of the organic polyisocyanate include: toluene polyisocyanates, such as 2,4-toluene diisocyanate and 2,6-toluene diisocyanate; diphenylmethane polyisocyanates, such as 4,4'-diphenylmethane diisocyanate, 2,4'-diphenylmethane diisocyanate, and 2,2'-diphenylmethane diisocyanate; phenylene polyisocyanates, such as 1,2-phenylene diisocyanate, 1,3-phenylene diisocyanate, 1,4-phenylene diisocyanate, 2,4,6-trimethylphenyl-1,3-diisocyanate, and 2,4,6-triisopropylphenyl-1,3-diisocyanate; naphthalene polyisocyanates, such as 1,4-naphthalene diisocyanate and 1,5-naphthalene diisocyanate; and aromatic polyisocyanates, such as chlorophenylene-2,4-diisocyanate, 4,4'-diphenylether diisocyanate, 3,3'-dimethyldiphenylmethane-4,4'-diisocyanate, and 3,3'-dimethoxydiphenyl-4,4'-diisocyanate. Examples thereof also include: aliphatic polyisocyanates, such as 1,5-pentamethylene diisocyanate, 1,6-hexamethylene diisocyanate, 1,4-tetramethylene diisocyanate, 2,2,4-trimethyl-1,6-hexamethylene diisocyanate, 2,4,4-trimethyl-1,6-hexamethylene diisocyanate, decamethylene diisocyanate, and lysine diisocyanate; aromatic-aliphatic polyisocyanates, such as o-xylylene diisocyanate, m-xylylene diisocyanate, and p-xylylene diisocyanate; and alicyclic polyisocyanates, such as 1,4-cyclohexyl diisocyanate, isophorone diisocyanate, hydrogenated toluene diisocyanate, hydrogenated xylylene diisocyanate, and hydrogenated diphenylmethane diisocyanate. Examples thereof further include: polymethylene polyphenyl polyisocyanate; and polymeric isocyanates, such as crude toluene diisocyanate. Examples thereof still further include modified polyisocyanates each having one or more uretdione bonds, isocyanurate bonds, allophanate bonds, biuret bonds, uretonimine bonds, carbodiimide bonds, urethane bonds, or urea bonds obtained by modifying those organic polyisocyanates. Those polyisocyanates may be used alone or in combination thereof.

Specific examples of the organic monoisocyanate include: aliphatic monoisocyanates, such as n-butyl monoisocyanate, n-hexyl monoisocyanate, n-hexadecyl monoisocyanate, and n-octadecyl monoisocyanate; and aromatic monoisocyanates, such as p-isopropylphenyl monoisocyanate, p-benzyloxyphenyl monoisocyanate, phenyl isocyanate, p-tolyl isocyanate, o-tolyl isocyanate, m-tolyl isocyanate, 4-chlorophenyl isocyanate, 3,5-dimethylphenyl isocyanate, and 2,6-dimethylphenyl isocyanate. Those monoisocyanates may be used alone or in combination thereof. The organic monoisocyanate is preferably used in combination with the organic polyisocyanate.

The high-molecular-weight isocyanate compound is, for example, an isocyanate group-containing resin. The isocyanate group-containing resin is a resin having one or more isocyanate groups therein, and any such isocyanate group reacts with an active hydrogen (group) to form a urethane bond, a urea bond, or the like, thereby crosslinking and curing the resin. The isocyanate group-containing resin may be suitably, for example, an isocyanate group-containing urethane prepolymer.

The isocyanate group-containing urethane prepolymer may be produced by causing an organic polyisocyanate compound and an active hydrogen-containing compound to react with each other collectively or sequentially at a molar ratio "isocyanate group/active hydrogen" in the range of from 1.2 to 10, preferably from 1.2 to 5 so that an isocyanate group may remain in the urethane prepolymer.

An isocyanate group content in the isocyanate group-containing urethane prepolymer is preferably from 0.3 mass % to 15 mass %, more preferably from 0.5 mass % to 5 mass %.

The number average molecular weight of the isocyanate group-containing urethane prepolymer is preferably 1,500 or more, more preferably from 1,500 to 20,000, still more preferably from 1,500 to 15,000, particularly preferably from 1,500 to 10,000. The number average molecular weight in the present invention is a numerical value in terms of polystyrene measured by gel permeation chromatography (GPC).

The isocyanate group-containing urethane prepolymer may be produced by a conventionally known method. The method is specifically, for example, a method including: loading an organic isocyanate compound and the active hydrogen-containing compound into a reaction vessel made of, for example, glass or stainless steel; and causing the compounds to react with each other while stirring the compounds at from 50° C. to 120° C. through use of a reaction catalyst or an organic solvent as required. At this time, it is preferred that the inside of the vessel be purged with a nitrogen gas in advance or the reaction be performed in a stream of a nitrogen gas because when an isocyanate group reacts with water such as moisture, the isocyanate group-containing urethane prepolymer is thickened.

The organic isocyanate compound may be, for example, an organic polyisocyanate. Examples of the organic polyisocyanate include the same examples as those described for the low-molecular-weight isocyanate compound. The organic polyisocyanates may be used alone or in combination thereof. Of the organic polyisocyanates, an aliphatic polyisocyanate, an aromatic-aliphatic polyisocyanate, an alicyclic polyisocyanate, and a modified polyisocyanate obtained by modifying any such organic polyisocyanate are preferred because the weather resistance of the curable composition becomes excellent.

In addition, an organic monoisocyanate may be used together with the organic polyisocyanate. That is, a mixture of the organic polyisocyanate and the organic monoisocyanate may be used as the above-mentioned organic isocyanate compound. Examples of the organic monoisocyanate include the same examples as those described for the low-molecular-weight isocyanate compound. The organic monoisocyanates may be used alone or in combination thereof.

The active hydrogen-containing compound is a compound having one or more active hydrogen (groups) therein. Specific examples thereof include a high-molecular-weight polyol, a high-molecular-weight polyamine, a low-molecular-weight polyol, a low-molecular-weight polyamine, and a high-molecular-weight or low-molecular-weight monool. Those active hydrogen-containing compounds may be used alone or in combination thereof.

The number average molecular weights of the high-molecular-weight polyol and the high-molecular-weight polyamine are each preferably from 1,000 to 30,000, more preferably from 1,000 to 20,000, particularly preferably from 1,000 to 10,000. In addition, the number average molecular weight of the high-molecular-weight monool is preferably 5,000 or less, more preferably 4,000 or less, particularly preferably from 1,000 to 4,000.

The molecular weights of the low-molecular-weight polyol, the low-molecular-weight polyamine, and the low-molecular-weight monool are each preferably less than 1,000, more preferably from 50 to 900. The molecular weights of those compounds may be calculated from their structures by calculation. In addition, when those compounds are, for example, polymerized products and have molecular weight distributions, their molecular weights may each be calculated as a number average molecular weight in terms of polystyrene measured by gel permeation chromatography (GPC).

Examples of the high-molecular-weight polyol include a polyester polyol, a polycarbonate polyol, a polyoxyalkylene-based polyol, a poly(meth)acrylic polyol, a hydrocarbon-based polyol, an animal or plant-based polyol, and copolyols thereof. In the present invention, the term "(meth)acrylic" means "acrylic and/or methacrylic."

Examples of the polyester polyol include polyester polyols each obtained by a reaction between one or more kinds of carboxylic acids, including polycarboxylic acids, such as succinic acid, adipic acid, sebacic acid, azelaic acid, terephthalic acid, isophthalic acid, orthophthalic acid, hexahydroterephthalic acid, hexahydroisophthalic acid, hexahydroorthophthalic acid, naphthalenedicarboxylic acid, and trimellitic acid, or anhydrides thereof or alkyl esters, such as methyl esters or ethyl esters, thereof, and one or more kinds of low-molecular-weight polyols, such as ethylene glycol, 1,2-propanediol, 1,3-propanediol, 1,2-butanediol, 1,3-butanediol, 1,4-butanediol, 1,5-pentanediol, 1,6-hexanediol, 3-methyl-1,5-pentanediol, neopentyl glycol, 1,8-octanediol, 1,9-nonanediol, diethylene glycol, dipropylene glycol, 1,4-cyclohexanedimethanol, an ethylene oxide or propylene oxide adduct of bisphenol A, trimethylolpropane, glycerin, and pentaerythritol.

An example of the polycarbonate polyol is a polycarbonate polyol obtained by a dehydrochlorination reaction between any one of the low-molecular-weight polyols to be used in the synthesis of the above-mentioned polyester polyol and phosgene, or an ester exchange reaction between any one of the above-mentioned low-molecular-weight polyols and diethylene carbonate, dimethyl carbonate, diethyl carbonate, or diphenyl carbonate.

Examples of the polyoxyalkylene-based polyol include: a polyoxyethylene-based polyol, a polyoxypropylene-based polyol, a polyoxybutylene-based polyol, a polyoxytetramethylene-based polyol, and a poly-(oxyethylene)-(oxypropylene) random or block copolymer-based polyol, which are obtained by the ring-opening addition polymerization or copolymerization of one or more kinds of cyclic ether compounds, such as ethylene oxide, propylene oxide, butylene oxide, and tetrahydrofuran, through use of, as an initiator, one or more kinds of low-molecular-weight polyols that are the same as those used in the synthesis of the above-mentioned polyester polyol, low-molecular-weight polyamines, low-molecular-weight amino alcohols, saccharide-based low-molecular-weight polyhydric alcohols, such as sorbitol, mannitol, sugar (sucrose), and glucose, and low-molecular-weight polyphenols, such as bisphenol A and bisphenol F; and a polyester ether polyol and a polycarbonate ether polyol using the above-mentioned polyester polyol and polycarbonate polyol as initiators. In addition, the polyoxyalkylene-based polyol is, for example, a polyol obtained by causing any one of those various polyols and an organic isocyanate compound to react with each other so that the amount of a hydroxyl group may be excessive with respect to the amount of an isocyanate group, thereby turning molecular terminals into hydroxyl groups. The number of hydroxyl groups in one molecule of the polyoxyalkylene-based polyol is preferably 2 or more, more preferably from 2 to 4, particularly preferably 2 or 3 on average.

The dispersity [weight average molecular weight (Mw)/number average molecular weight (Mn)] of the polyoxyalkylene-based polyol is preferably 1.6 or less, more preferably from 1.0 to 1.5. The weight average molecular weight in the present invention is a numerical value in terms of polystyrene measured by gel permeation chromatography (GPC).

A catalyst at the time of the synthesis of the polyoxyalkylene-based polyol is, for example, an alkali metal compound catalyst, such as a sodium-based catalyst or a potassium-based catalyst, a cationic polymerization catalyst, a composite metal cyanide complex catalyst, such as a glyme complex or diglyme complex of zinc hexacyanocobaltate, or a phosphazene compound catalyst. Of those, an alkali metal compound catalyst or a composite metal cyanide complex catalyst is preferred. In addition, the polyoxyalkylene-based polyol synthesized by using the composite metal cyanide complex catalyst is preferred because its total unsaturation degree is low, and the viscosity of the polyol is low.

In addition, a polyoxyalkylene-based monool, such as a polyoxypropylene-based monool, obtained by the ring-opening addition polymerization of the above-mentioned cyclic ether compound, such as propylene oxide, through use of a low-molecular-weight monoalcohol, such as methyl alcohol, ethyl alcohol, or propyl alcohol, as an initiator may be used for modifying the urethane prepolymer.

The term "based" in the polyoxyalkylene-based polyol or the polyoxyalkylene-based monool described above means that as long as 50 mass % or more, preferably 80 mass % or more, more preferably 90 mass % or more, particularly preferably 95 mass % or more of a portion excluding a hydroxyl group in 1 mol of molecules includes polyoxyalkylene, the balance may be modified with an ester, urethane, polycarbonate, polyamide, poly(meth)acrylate, polyolefin, or the like. In the present invention, the term "(meth)acrylate" means "an acrylate and/or a methacrylate."

The poly(meth)acrylic polyol is obtained through the copolymerization of a hydroxyl group-containing (meth)acrylic monomer and an ethylenically unsaturated compound except the monomer in the presence or absence of a solvent by a radical polymerization method, such as batch type polymerization or continuous polymerization. The poly(meth)acrylic polyol obtained through a continuous bulk copolymerization reaction between the hydroxyl group-containing (meth)acrylic monomer and the ethylenically unsaturated compound in the absence of a solvent at a temperature as high as from 150° C. to 350° C., more preferably from 210° C. to 250° C. is preferred because the reaction product has a narrow molecular weight distribution and a low viscosity. At the time of the copolymerization reaction, the hydroxyl group-containing (meth)acrylic monomer is preferably used so that an average hydroxyl group functional number per one molecule of the poly(meth)acrylic polyol may be from 1.2 to 4. The glass transition point (Tg) of the poly(meth)acrylic polyol is preferably 50° C. or less, more preferably 0° C. or less, still more preferably from −70° C. to −20° C., particularly preferably from −70° C. to −30° C.

The hydroxyl group-containing (meth)acrylic monomer is a (meth)acrylic monomer having one or more hydroxyl groups in a molecule thereof. Specific examples thereof include: hydroxyalkyl (meth)acrylates, such as hydroxyethyl (meth)acrylate, hydroxypropyl (meth)acrylate, and hydroxybutyl (meth)acrylate; and mono(meth)acrylates or hydroxyl group-remaining poly(meth)acrylates of polyhydric alcohols, such as pentaerythritol tri(meth)acrylate, glycerin mono(meth)acrylate, pentaerythritol di(meth)acrylate monostearate, dipentaerythritol penta(meth)acrylate, ditrimethylolpropane tri(meth)acrylate, and polypropylene glycol mono(meth)acrylate. Those monomers may be used alone or in combination thereof. Of those, hydroxyalkyl (meth)acrylates are preferred because the poly(meth)acrylic polyol to be obtained has a low viscosity and satisfactory reactivity with an isocyanate group, and hydroxyethyl (meth)acrylate is more preferred.

Examples of the ethylenically unsaturated compound except the hydroxyl group-containing (meth)acrylic monomer include a (meth)acrylic monomer and an ethylenically unsaturated compound except the (meth)acrylic monomer. Examples of the ethylenically unsaturated compound except the (meth)acrylic monomer include vinyl compounds, such as ethylene, propylene, isobutylene, butadiene, chloroprene, styrene, chlorostyrene, 2-methylstyrene, and divinylbenzene. Examples of the (meth)acrylic monomer include (meth)acrylic acid, methyl (meth)acrylate, ethyl (meth)acrylate, butyl (meth)acrylate, isobutyl (meth)acrylate, 2-ethylhexyl (meth)acrylate, benzyl (meth)acrylate, stearyl (meth)acrylate, cyclohexyl (meth)acrylate, tridecyl (meth)acrylate, ethylene glycol di(meth)acrylate, 1,6-hexanediol di(meth)acrylate, neopentyl glycol di(meth)acrylate, 1,3-butanediol di(meth)acrylate, 1,4-butanediol di(meth)acrylate, diethylene glycol di(meth)acrylate, triethylene glycol di(meth)acrylate, tetraethylene glycol di(meth)acrylate, tripropylene glycol di(meth)acrylate, polyethylene glycol di(meth)acrylate, polypropylene glycol di(meth)acrylate, glycidyl tri(meth)acrylate, and trimethylolpropane tri(meth)acrylate. Those compounds may be used alone or in combination thereof. Of those, a monomer of a (meth)acrylic acid ester-based compound is preferred because the poly(meth)acrylic polyol to be obtained has a low viscosity, and methyl (meth)acrylate, ethyl (meth)acrylate, propyl (meth)acrylate, butyl (meth)acrylate, and 2-ethylhexyl (meth)acrylate are more preferred. In the present invention, the term "(meth)acrylic acid" means "acrylic acid and/or methacrylic acid."

Examples of the hydrocarbon-based polyol include: polyolefin polyols, such as polybutadiene polyol and polyisoprene polyol; polyalkylene polyols, such as hydrogenated polybutadiene polyol and hydrogenated polyisoprene polyol; and halogenated polyalkylene polyols, such as chlorinated polypropylene polyol and chlorinated polyethylene polyol.

Examples of the animal or plant-based polyol include castor oil-based polyol and silk fibroin.

The above-mentioned high-molecular-weight polyols may be used alone or in combination thereof. Of those, the polyoxyalkylene-based polyol or the poly(meth)acrylic polyol is preferred because the rubber physical properties of the curable composition after its curing are satisfactory.

A photoreactive unsaturated bond may be introduced into the isocyanate group-containing urethane prepolymer for the purpose of imparting weather resistance thereto. The urethane prepolymer having introduced thereinto the photoreactive unsaturated bond not only serves as a curable component in the curable composition of the present invention but also imparts, to the composition after its curing, satisfactory adhesiveness with an adherend surface and excellent weather resistance. The above-mentioned photoreactive unsaturated bond is an unsaturated bond that causes a chemical change, such as polymerization, within a relatively short time period by being exposed to light. Specific examples thereof include unsaturated bonds derived from a vinyl group, a vinylene group, and a (meth)acryloyl group. In the present invention, the term "(meth)acryloyl group" means "an acryloyl group and/or a methacryloyl group."

An isocyanate group of the isocyanate group-containing urethane prepolymer having introduced thereinto the photoreactive unsaturated bond reacts with the active hydrogen-containing compound to crosslink and cure the curable composition. In addition, the photoreactive unsaturated bond of the isocyanate group-containing urethane prepolymer having introduced thereinto the photoreactive unsaturated bond undergoes a polymerization reaction when exposed to light, thereby forming, on the surface of the curable composition, a cured coating film excellent in weather resistance. The cured coating film may impart excellent weather resistance to the curable composition. The photoreactive unsaturated bond is preferably an unsaturated bond derived from a (meth)acryloyl group because of its high weather resistance-imparting effect.

Examples of a method of introducing the photoreactive unsaturated bond into the isocyanate group-containing urethane prepolymer include the following methods:

(a) a method including causing the organic isocyanate compound, a high-molecular-weight active hydrogen-containing compound (number average molecular weight: 1,000 or more), and a low-molecular-weight active hydrogen-containing compound (number average molecular weight: less than 1,000) having active hydrogen and the photoreactive unsaturated bond in a molecule thereof to react with each other under such a condition that the amount of an isocyanate group is excessive with respect to the total amount of active hydrogen, thereby providing the prepolymer;

(b) a method including causing the organic isocyanate compound, and a high-molecular-weight active hydrogen-containing compound (number average molecular weight: 1,000 or more) having active hydrogen and the photoreactive unsaturated bond in a molecule thereof (e.g., a mono(meth)acrylate of polyoxyalkylene triol, an alkylene oxide adduct of (meth)acrylic acid, or polybutadiene polyol) to react with each other under such a condition that the amount of an isocyanate group is excessive with respect to the total amount of active hydrogen, thereby providing the prepolymer; and (c) a method including causing the organic isocyanate compound, a low-molecular-weight active hydrogen-containing compound (number average molecular weight: less than 1,000) having the photoreactive unsaturated group and an isocyanate group in a molecule thereof (e.g., (meth) acryloyl isocyanate), and the high-molecular-weight active hydrogen-containing compound (number average molecular weight: 1,000 or more) to react with each other under such a condition that the amount of an isocyanate group is excessive with respect to the total amount of active hydrogen, thereby providing the prepolymer.

Of those methods, the method (a) is preferred in terms of ease of availability of the raw materials and ease of the reaction.

The reaction for introducing the photoreactive unsaturated bond into the isocyanate group-containing urethane prepolymer may be performed by collectively loading the raw materials, or may be performed by sequentially loading the raw materials. The molar ratio (isocyanate group/active hydrogen) of an isocyanate group of the organic isocyanate compound to active hydrogen of the active hydrogen-containing compound (including a compound having active hydrogen and the photoreactive unsaturated bond) is preferably from 1.2 to 10, more preferably from 1.2 to 5. An isocyanate group content in the isocyanate group-containing urethane prepolymer having introduced thereinto the photoreactive unsaturated bond is preferably from 0.3 mass % to 15 mass %, more preferably from 0.5 mass % to 5 mass %.

The concentration of the photoreactive unsaturated bond in the isocyanate group-containing urethane prepolymer having introduced thereinto the photoreactive unsaturated bond is preferably 0.01 mmol/g or more, more preferably from 0.03 mmol/g to 1 mmol/g, particularly preferably from 0.05 mmol/g to 0.5 mmol/g.

The above-mentioned (low-molecular-weight and high-molecular-weight) active hydrogen-containing compounds each having active hydrogen and the photoreactive unsaturated bond are each a compound having both of an active hydrogen (group), such as a hydroxyl group, an amino group, or a carboxyl group, and the photoreactive unsaturated bond, such as a vinyl group, a vinylene group, or a (meth)acryloyl group, therein. A compound having a hydroxyl group and a (meth)acryloyl group therein is preferred because of its ease of the reaction with the organic isocyanate compound and high weather resistance-imparting effect. In addition, the molecular weight of the compound having an active hydrogen (group) and the photoreactive unsaturated bond is preferably less than 1,000 in terms of number average molecular weight because of its ease of the reaction.

Examples of the active hydrogen-containing compound having a hydroxyl group and a (meth)acryloyl group include: monohydroxy mono(meth)acrylates, such as 2-hydroxyethyl (meth)acrylate, 2-hydroxypropyl (meth)acrylate, 2-hydroxybutyl (meth)acrylate, 4-hydroxybutyl (meth)acrylate, 4-hydroxypentyl (meth)acrylate, hydroxyneopentyl (meth)acrylate, 6-hydroxyhexyl (meth)acrylate, hydroxyheptyl (meth)acrylate, and hydroxyoctyl (meth)acrylate, each being a monoester of an alkylene glycol, such as ethylene glycol, propylene glycol, or butylene glycol, and (meth)acrylic acid; and monohydroxy poly(meth)acrylates, such as glycerin di(meth)acrylate, trimethylolpropane di(meth)acrylate, and pentaerythritol tri(meth)acrylate, polyhydroxy mono(meth)acrylates, such as glycerin mono(meth)acrylate, trimethylolpropane mono(meth)acrylate, and pentaerythritol mono(meth)acrylate, and polyhydroxy poly(meth)acrylates, such as pentaerythritol di(meth)acrylate, each being a monoester or a polyester, such as a diester or a triester, of a trifunctional or higher alkylene polyol, such as glycerin, trimethylolpropane, or pentaerythritol, and (meth)acrylic acid. In addition, examples thereof also include: monohydroxy mono(meth)acrylates, polyhydroxy mono(meth)acrylates, and polyhydroxy poly(meth)acrylates of polyols each obtained by adding an alkylene oxide, such as ethylene oxide, propylene oxide, or butylene oxide, to diethylene glycol, dipropylene glycol, polyoxyethylene polyol, polyoxypropylene polyol, bisphenol A, or bisphenol F; compounds each having a hydroxyl group, the compounds each being obtained by adding an alkylene oxide, such as ethylene oxide, propylene oxide, or butylene oxide, to active hydrogen of (meth)acrylic acid or a hydroxyalkyl (meth)acrylate, such as hydroxyethyl (meth)acrylate; and compounds each having a hydroxyl group, the compounds each being a caprolactone-modified product of hydroxyethyl acrylate. Those compounds may be used alone or in combination thereof. Of those, monohydroxy poly(meth)acrylates and dihydroxy poly(meth)acrylates are preferred because each of the poly(meth)acrylates can suppress the viscosity of the urethane prepolymer to a low level, and can improve the weather resistance-imparting effect.

The curable composition may further include an acidic compound. The acidic compound is used for the purpose of accelerating the hydrolysis of the silylamine compound to speed up the curing of the curable composition. Examples of the acidic compound may include a phosphoric acid ester compound, an organic carboxylic acid compound, an organic carboxylic acid anhydride compound, an organic sulfonic acid isocyanate compound, an organic sulfonic acid compound, and an organic sulfonimide compound. Those compounds may be used alone or in combination thereof.

Examples of the phosphoric acid ester compound include an orthophosphoric acid ester compound and a phosphorous acid ester compound. Of those, an orthophosphoric acid ester compound is preferred. Those compounds may be used alone or in combination thereof.

Examples of the orthophosphoric acid ester compound include a trialkyl ester compound of orthophosphoric acid, a dialkyl ester compound of orthophosphoric acid, and a monoalkyl ester compound of orthophosphoric acid.

Examples of the trialkyl ester compound of orthophosphoric acid include trimethyl phosphate, triethyl phosphate, triphenyl phosphate, tricresyl phosphate, trixylenyl phosphate, cresyl diphenyl phosphate, and cresyl di-2,6-xylenyl phosphate.

Examples of the monoalkyl ester compound and dialkyl ester compound of orthophosphoric acid (acid phosphoric acid ester compounds) include ethyl acid phosphate, butyl acid phosphate, dibutyl pyrophosphate, butoxyethyl acid phosphate, 2-ethylhexyl acid phosphate, alkyl (C12, C14, C16, C18) acid phosphate, isotridecyl acid phosphate, oleyl acid phosphate, tetracosyl acid phosphate, ethylene glycol acid phosphate, and 2-hydroxyethyl methacrylate acid phosphate. Examples of the monoalkyl ester compound include monoethyl phosphate, monobutyl phosphate, monobutoxyethyl phosphate, mono-n-octyl phosphate, mono-2-ethylhexyl phosphate, monolauryl phosphate, and mono(2-hydroxyethyl methacrylate) phosphate. Examples of the dialkyl ester compound include diethyl phosphate, dibutyl phosphate, dibutyl pyrophosphate, dibutoxyethyl phosphate, di-n-octyl phosphate, bis(2-ethylhexyl) phosphate, diisotridecyl phosphate, and dioleyl phosphate. Those orthophosphoric acid ester compounds may be used alone or in combination thereof.

Examples of the phosphorous acid ester compound include: phosphorous acid triester compounds, such as triethyl phosphite, triphenyl phosphite, trisnonylphenyl phosphite, tridecyl phosphite, diphenyl mono(2-ethylhexyl) phosphite, and diphenyl monodecyl phosphite; and phosphorous acid diester compounds, such as dilauryl hydrogen phosphite, dioleyl hydrogen phosphite, and diphenyl hydrogen phosphite. Those phosphorous acid ester compounds may be used alone or in combination thereof.

Specific examples of the organic carboxylic acid compound include formic acid, acetic acid, propionic acid, butyric acid, valeric acid, caproic acid, enanthic acid, caprylic acid, 2-ethylhexanoic acid, pelargonic acid, capric acid, undecanoic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, montanoic acid, melissic acid, lacceroic acid, acrylic acid, methacrylic acid, lactic acid, 1-methylbutyric acid, isobutyric acid, 2-ethylbutyric acid, isovaleric acid, tuberculostearic acid, pivalic acid, neodecanoic acid, adipic acid, azelaic acid, pimelic acid, suberic acid, sebacic acid, ethylmalonic acid, glutaric acid, oxalic acid, malonic acid, succinic acid, oxydiacetic acid, maleic acid, fumaric acid, acetylenedicarboxylic acid, itaconic acid, benzoic acid, 9-anthracenecarboxylic acid, anisic acid, isopropylbenzoic acid, toluic acid, phthalic acid, isophthalic acid, terephthalic acid, carboxyphenylacetic acid, pyromellitic acid, and salicylic acid. Those compounds may be used alone or in combination thereof.

Specific examples of the organic carboxylic acid anhydride compound may include maleic anhydride, succinic anhydride, tetrahydrophthalic anhydride, methyl tetrahydrophthalic anhydride, methyl nadic anhydride, an alkenyl succinic anhydride, hexahydrophthalic anhydride, methylhexahydrophthalic anhydride, and methylcyclohexene tetracarboxylic acid anhydride. Those compounds may be used alone or in combination thereof.

A specific example of the organic sulfonic acid isocyanate compound may be p-toluenesulfonyl isocyanate.

Specific examples of the organic sulfonic acid compound may include methanesulfonic acid, ethanesulfonic acid, benzenesulfonic acid, p-toluenesulfonic acid, dodecylbenzenesulfonic acid, trifluoromethanesulfonic acid, nonafluoro-1-butanesulfonic acid, heptadecafluorooctanesulfonic acid, (+)-10-camphor sulfonic acid, m-xylene-4-sulfonic anhydride, and p-xylene-2-sulfonic anhydride.

Specific examples of the organic sulfonimide compound may include saccharin and N-(trifluoromethanesulfonyl)trifluoroacetamide.

The amount of the acidic compound in the curable composition is preferably from 0.05 part by mass to 5 parts by mass, more preferably from 0.1 part by mass to 3 parts by mass with respect to 100 parts by mass of the total amount of the isocyanate compound and the silylamine compound (1).

The curable composition may be blended with various additives as required. Specific examples of the additives may include a curing accelerating catalyst, a plasticizer, a weathering stabilizer, a filler, a thixotropy-imparting agent, an adhesiveness-improving agent, a storage stability-improving agent (dehydration agent), a colorant, and an organic solvent. Those additives may be used alone or in combination thereof.

When the organic solvent is used, specific examples of the organic solvent include pentane, hexane, heptane, octane, cyclohexane, toluene, xylene, ethyl formate, butyl formate, ethyl acetate, butyl acetate, methyl ethyl ketone, acetone, acetonitrile, propionitrile, diethyl ether, dibutyl ether, and tetrahydrofuran.

EXAMPLES

The present invention is specifically described below based on Examples. However, the present invention is by no means limited thereto. In Examples, a $^1$H-NMR was measured with AV400 manufactured by Bruker BioSpin GmbH at 400 MHz. The chemical shift of the $^1$H-NMR was determined with respect to the chemical shift (7.20 ppm) of the peak of benzene in heavy benzene.

In this description, a polymerization degree is a number average polymerization degree unless otherwise stated, and the polymerization degree "n" of each of silylamine compounds E to J was determined from an integration ratio between an ethereal oxygen atom-adjacent position and a nitrogen atom-adjacent position in its $^1$H-NMR analysis.

In addition, in Examples, the term "intramolecular oxygen atom number" refers to the number of ethereal oxygen atoms in a silylamine compound. The "intramolecular oxygen atom number" of each of the silylamine compounds E to J was calculated by adding, to the polymerization degree "n"

of the compound, the number of oxygen atoms that were not included in a repeating unit thereof, that is, 1.

Example 1

Synthesis of Silylamine Compound A

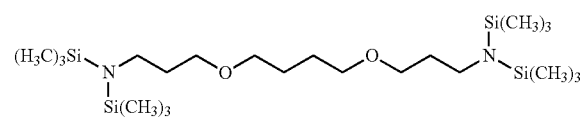

160.0 Grams (783 mmol) of 4,9-dioxa-1,12-dodecanediamine, 477.2 g (3,135 mmol) of 1,8-diazabicyclo[5.4.0]-7-undecene, and 810 mL of acetonitrile were loaded into a 3-liter four-necked flask whose inside had been purged with nitrogen. The resultant mixture was cooled to 10° C. or less, and 343.1 g (3,158 mmol) of chlorotrimethylsilane was dropped into the mixture. After that, the resultant reaction mixture was stirred at 25° C. for 24 hours. The reaction mixture was subjected to an extraction operation with 150 mL of heptane three times. The heptane layer was concentrated under reduced pressure, and was then filtered under nitrogen to provide 339.1 g of a silylamine compound A represented by the foregoing formula (yield: 87.9%). The $^1$H-NMR analysis results of the compound are described below.

$^1$H-NMR ($C_6D_6$) δ (ppm): 3.28-3.25 (m, 4H), 3.23-3.21 (m, 4H), 2.98-2.94 (m, 4H), 1.68-1.65 (m, 8H), 0.17 (s, 36H)

Example 2

Synthesis of Silylamine Compound B

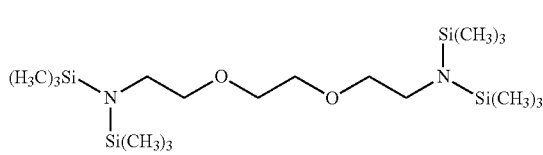

20.3 Grams (137 mmol) of 3,6-dioxa-1,8-octanediamine, 83.6 g (549 mmol) of 1,8-diazabicyclo[5.4.0]-7-undecene, and 155 mL of acetonitrile were loaded into a 500-milliliter four-necked flask whose inside had been purged with nitrogen. The resultant mixture was cooled to 10° C. or less, and 58.9 g (548 mmol) of chlorotrimethylsilane was dropped into the mixture. After that, the reaction mixture was stirred at 25° C. for 21 hours. The reaction mixture was subjected to an extraction operation with 50 mL of heptane four times. The heptane layer was concentrated under reduced pressure, and was then filtered under nitrogen to provide 52.8 g of a silylamine compound B represented by the foregoing formula (yield: 88.3%). The $^1$H-NMR analysis results of the compound are described below.

$^1$H-NMR ($C_6D_6$) δ (ppm): 3.43 (s, 4H), 3.29 (t, J=7.0 Hz, 4H), 2.98-2.94 (m, 4H), 0.15 (s, 36H)

Example 3

Synthesis of Silylamine Compound C

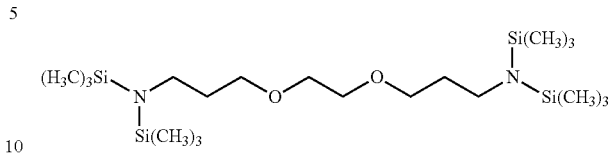

15.3 Grams (87 mmol) of 4,7-dioxa-1,10-decanediamine, 52.4 g (344 mmol) of 1,8-diazabicyclo[5.4.0]-7-undecene, and 155 mL of acetonitrile were loaded into a 400-milliliter four-necked flask whose inside had been purged with nitrogen. The resultant mixture was cooled to 10° C. or less, and 37.4 g (344 mmol) of chlorotrimethylsilane was dropped into the mixture. After that, the reaction mixture was stirred at 25° C. for 14 hours. The reaction mixture was subjected to an extraction operation with 50 mL of heptane four times. The heptane layer was concentrated under reduced pressure, and was then filtered under nitrogen to provide 36.4 g of a silylamine compound C represented by the foregoing formula (yield: 90.1%). The $^1$H-NMR analysis results of the compound are described below.

$^1$H-NMR ($C_6D_6$) 5 (Ppm): 3.42 (s, 4H), 3.29-3.26 (m, 4H), 2.98-2.94 (m, 4H), 1.72-1.65 (m, 4H), 0.15 (s, 36H)

Example 4

Synthesis of Silylamine Compound D

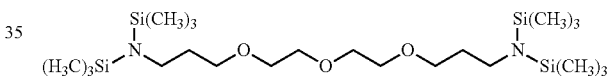

15.0 Grams (68 mmol) of 4,7,10-trioxa-1,13-tridecanediamine, 41.5 g (273 mmol) of 1,8-diazabicyclo[5.4.0]-7-undecene, and 190 mL of acetonitrile were loaded into a 500-milliliter four-necked flask whose inside had been purged with nitrogen. The resultant mixture was cooled to 10° C. or less, and 30.0 g (276 mmol) of chlorotrimethylsilane was dropped into the mixture. After that, the reaction mixture was stirred at 25° C. for 23 hours. The reaction mixture was subjected to an extraction operation with 50 mL of heptane five times. The heptane layer was concentrated under reduced pressure, and was then filtered under nitrogen to provide 29.5 g of a silylamine compound D represented by the foregoing formula (yield: 85.2%). The $^1$H-NMR analysis results of the compound are described below.

$^1$H-NMR ($C_6D_6$) δ (ppm): 3.54-3.52 (m, 4H), 3.44-3.42 (m, 4H), 3.27-3.24 (m, 4H), 2.97-2.93 (m, 4H), 1.70-1.66 (m, 4H), 0.19 (s, 36H)

Example 5

Synthesis of Silylamine Compound E
(i) Synthesis of PEG 300-EtCN

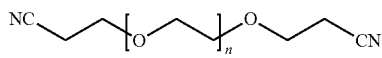

20.1 Grams (67 mmol) of polyethylene glycol 300 (manufactured by FUJIFILM Wako Pure Chemical Corporation), 5.0 mL of water, and 0.1 g (1 mmol) of a 48% aqueous solution of sodium hydroxide were loaded into a 200-milliliter three-necked flask whose inside had been purged with nitrogen. While the temperature of the reaction liquid was kept at from 25° C. to 30° C., 10.6 g (200 mmol) of acrylonitrile was dropped into the liquid. The resultant reaction mixture was stirred at 25° C. for 2 hours, and then 0.5 g (2 mmol) of trifluoroacetic acid was added to the mixture to terminate the reaction. The mixture was concentrated under reduced pressure to provide 27.5 g of PEG 300-EtCN represented by the foregoing formula (yield: 99.7%). The $^1$H-NMR analysis results of the compound are described below.

$^1$H-NMR (C$_6$D$_6$) δ (ppm): 3.66-3.22 (m, 76H), 2.73-2.69 (m, 4H), 1.86-1.78 (m, 4H)

(ii) Synthesis of Silylamine Compound E

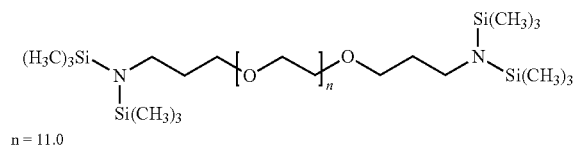

n = 11.0

20.0 Grams (49 mmol) of the PEG 300-EtCN, 368 mL of methanol, 43.1 g (198 mmol) of di-tert-butyl dicarbonate, and 2.3 g (10 mmol) of nickel chloride hexahydrate were loaded into a 500-milliliter four-necked flask whose inside had been purged with nitrogen. The resultant mixture was cooled to 10° C. or less, and 25.1 g (318 mmol) of sodium borohydride was added to the mixture over 2 hours in a stream of nitrogen. The resultant reaction mixture was stirred at 25° C. for 5 hours, and then 50 mL of a saturated aqueous solution of sodium carbonate was added to the mixture, followed by the performance of an extraction operation with 100 mL of ethyl acetate three times. The ethyl acetate layer was dried with magnesium sulfate, and was concentrated under reduced pressure. 100 Milliliters of water and 20 mL of concentrated hydrochloric acid were added to the concentrate, and the mixture was stirred at 25° C. for 13 hours. After that, 20 mL of concentrated hydrochloric acid was further added to the mixture, and the whole was stirred at 60° C. for 2 hours. 30 Milliliters of a 48% aqueous solution of sodium hydroxide was added to the reaction mixture, and the resultant mixture was concentrated under reduced pressure. 200 Milliliters of tetrahydrofuran was added to the resultant residue, and the mixture was filtered.

The filtrate was concentrated under reduced pressure, and 42.1 g (389 mmol) of chlorotrimethylsilane, 61.1 g (401 mmol) of 1,8-diazabicyclo[5.4.0]-7-undecene, and 101 mL of toluene were added to 20.0 g of the residue. The resultant reaction mixture was stirred at 25° C. for 72 hours, and 14.6 g (153 mmol) of diethylamine was dropped into the mixture. The reaction mixture was filtered, and the filtrate was concentrated under reduced pressure to provide 23.6 g of the silylamine compound E represented by the foregoing formula (yield: 69.5%). The $^1$H-NMR analysis results of the compound are described below. In addition, the $^1$H-NMR analysis results showed that the silylamine compound E had a polymerization degree "n" of 11.0 and an intramolecular oxygen atom number of 12.0.

$^1$H-NMR (C$_6$D$_6$) δ (ppm): 3.66-3.16 (m, 48H), 2.95-2.91 (m, 4H), 1.70-1.63 (m, 4H), 0.17 (s, 36H)

Example 6

Synthesis of Silylamine Compound F (i) Synthesis of PEG 400-EtCN

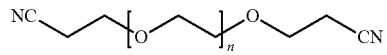

20.0 Grams (50 mmol) of polyethylene glycol 400 (manufactured by FUJIFILM Wako Pure Chemical Corporation), 5.3 mL of water, and 0.1 g (1 mmol) of a 48% aqueous solution of sodium hydroxide were loaded into a 200-milliliter three-necked flask whose inside had been purged with nitrogen. While the temperature of the reaction liquid was kept at from 25° C. to 30° C., 8.0 g (150 mmol) of acrylonitrile was dropped into the liquid. The resultant reaction mixture was stirred at 25° C. for 6 hours, and then 0.5 g (2 mmol) of trifluoroacetic acid was added to the mixture to terminate the reaction. The mixture was concentrated under reduced pressure to provide 25.6 g of PEG 400-EtCN represented by the foregoing formula (yield: 99.2%). The $^1$H-NMR analysis results of the compound are described below.

$^1$H-NMR (C$_6$D$_6$) δ (ppm): 3.59-3.02 (m, 171H), 2.76-2.73 (m, 4H), 1.69-1.66 (m, 4H)

(ii) Synthesis of Silylamine Compound F

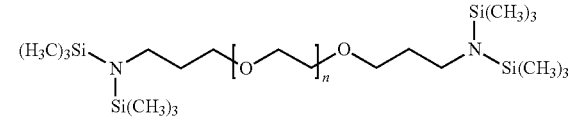

n = 13.9

20.0 Grams (34 mmol) of the PEG 400-EtCN, 293 mL of methanol, 35.2 g (161 mmol) of di-tert-butyl dicarbonate, and 1.9 g (8 mmol) of nickel chloride hexahydrate were loaded into a 500-milliliter four-necked flask whose inside had been purged with nitrogen. The resultant mixture was cooled to 10° C. or less, and 27.0 g (343 mmol) of sodium borohydride was added to the mixture over 2 hours in a stream of nitrogen. The resultant reaction mixture was stirred at 25° C. for 5 hours, and then 50 mL of a saturated aqueous solution of sodium carbonate was added to the mixture, followed by the performance of an extraction operation with 55 mL of ethyl acetate three times. The ethyl acetate layer was dried with magnesium sulfate, and was concentrated under reduced pressure. 63 Milliliters of methanol and 10 mL of concentrated hydrochloric acid were added to the concentrate, and the mixture was stirred at 25° C. for 13 hours. After that, 20 mL of concentrated hydrochloric acid was further added to the mixture, and the whole was stirred at 50° C. for 3 hours. 30 Milliliters of a 48% aqueous solution of sodium hydroxide was added to the reaction mixture, and the resultant mixture was concentrated under reduced pressure. 200 Milliliters of tetrahydrofuran was added to the resultant residue, and the mixture was filtered.

The filtrate was concentrated under reduced pressure, and 33.1 g (305 mmol) of chlorotrimethylsilane, 44.1 g (290 mmol) of 1,8-diazabicyclo[5.4.0]-7-undecene, and 94 mL of toluene were added to 18.4 g of the residue. The resultant reaction mixture was stirred at 25° C. for 72 hours, and 11.2 g (153 mmol) of diethylamine was dropped into the mixture.

The reaction mixture was filtered, and the filtrate was concentrated under reduced pressure to provide 7.73 g of the silylamine compound F represented by the foregoing formula (yield: 28.4%). The $^1$H-NMR analysis results of the compound are described below. In addition, the $^1$H-NMR analysis results showed that in the foregoing formula, the polymerization degree "n" was 13.9 and an intramolecular oxygen atom number was 14.9.

$^1$H-NMR ($C_6D_6$) δ (ppm): 3.66-3.22 (m, 60H), 2.95-2.91 (m, 4H), 1.69-1.62 (m, 4H), 0.16 (s, 36H)

Example 7

Synthesis of Silylamine Compound G
(i) Synthesis of PEG 600-EtCN

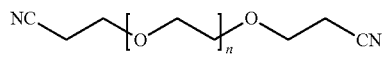

20.3 Grams (33 mmol) of polyethylene glycol 600 (manufactured by Kishida Chemical Co., Ltd.), 5 mL of water, and 0.1 g (1 mmol) of a 48% aqueous solution of sodium hydroxide were loaded into a 200-milliliter three-necked flask whose inside had been purged with nitrogen. While the temperature of the reaction liquid was kept at from 25° C. to 30° C., 5.3 g (100 mmol) of acrylonitrile was dropped into the liquid. The resultant reaction mixture was stirred at 25° C. for 22 hours, and then 0.5 g (2 mmol) of trifluoroacetic acid was added to the mixture to terminate the reaction. The mixture was concentrated under reduced pressure to provide 31.7 g of PEG 600-EtCN represented by the foregoing formula (yield: 98.3%). The $^1$H-NMR analysis results of the compound are described below.

$^1$H-NMR ($C_6D_6$) δ (ppm): 3.59-3.02 (m, 109H), 2.61-2.58 (m, 4H), 1.52-1.49 (m, 4H)

(ii) Synthesis of PEGPA-600

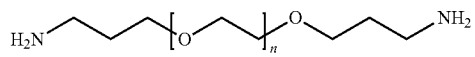

10.0 Grams (8 mmol) of the PEG 600-EtCN, 106 mL of methanol, 12.4 g (57 mmol) of di-tert-butyl dicarbonate, and 0.7 g (3 mmol) of nickel chloride hexahydrate were loaded into a 500-milliliter four-necked flask whose inside had been purged with nitrogen. The resultant mixture was cooled to 10° C. or less, and 9.71 g of sodium borohydride was added to the mixture over 30 minutes in a stream of nitrogen. The resultant reaction mixture was stirred at 25° C. for 4.5 hours, and 50 mL of a saturated aqueous solution of sodium carbonate was added to the mixture to terminate the reaction. The reaction mixture was subjected to an extraction operation with 50 g of ethyl acetate three times. The ethyl acetate layer was dried with magnesium sulfate, and was concentrated under reduced pressure. 63 Milliliters of methanol and 3 mL of concentrated hydrochloric acid were added to the concentrate, and the mixture was stirred at 25° C. for 5 days. After that, sodium hydroxide was added to the mixture to set its pH to 11 or more. The mixture was concentrated under reduced pressure, and then 150 mL of tetrahydrofuran was added to the concentrate, followed by filtration. The filtrate was concentrated under reduced pressure to provide 7.66 g of PEGPA-600 represented by the foregoing formula (yield: 91.4%). The $^1$H-NMR analysis results of the compound are described below.

$^1$H-NMR ($C_6D_6$) δ (ppm): 3.68-3.29 (m, 70H), 2.67-2.60 (m, 4H), 1.57-1.52 (m, 4H)

(iii) Synthesis of Silylamine Compound G

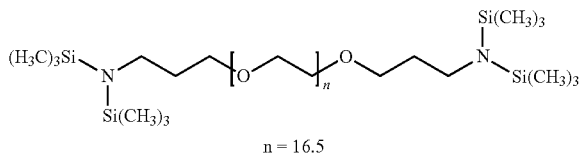

n = 16.5

6.9 Grams (8 mmol) of the PEGPA-600, 4.9 g (32 mmol) of 1,8-diazabicyclo[5.4.0]-7-undecene, and 35 mL of toluene were loaded into a 500-milliliter recovery flask whose inside had been purged with nitrogen. 3.5 Grams (32 mmol) of chlorotrimethylsilane was dropped into the resultant reaction mixture, and then the whole was stirred at 25° C. for 25 hours. 10.0 Grams (92 mmol) of chlorotrimethylsilane and 3.0 g (20 mmol) of 1,8-diazabicyclo[5.4.0]-7-undecene were further added to the reaction mixture, and the whole was stirred at 25° C. for 20 hours. 30.5 Grams (417 mmol) of diethylamine was dropped into the reaction mixture. A filtrate obtained by filtering the reaction mixture was concentrated under reduced pressure to provide 8.41 g of the silylamine compound G represented by the foregoing formula (yield: 77.1%). The $^1$H-NMR analysis results of the compound are described below. The $^1$H-NMR analysis results showed that in the foregoing formula, the polymerization degree "n" was 16.5 and an intramolecular oxygen atom number was 17.5.

$^1$H-NMR ($C_6D_6$) δ (ppm): 3.69-3.18 (m, 78H), 3.01-2.93 (m, 4H), 1.72-1.65 (m, 4H), 0.19 (s, 36H)

Example 8

Synthesis of Silylamine Compound H
(i) Synthesis of PEGPA-1,000

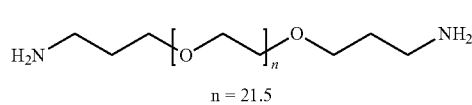

n = 21.5

1,477.6 Grams (1,478 mmol) of polyethylene glycol 1,000 (manufactured by FUJIFILM Wako Pure Chemical Corporation) and 367 mL of water were loaded into a 3-liter recovery flask whose inside had been purged with nitrogen, and the resultant mixture was heated. At the time point when the temperature of the mixture became 47° C., 1.2 g of a 48% aqueous solution of sodium hydroxide and 1.8 g of water were added to the mixture. The temperature of the mixture was kept at 47° C., and the mixture was stirred for 1 hour. After that, the mixture was cooled to 25° C. 235.2 Grams (4,433 mmol) of acrylonitrile was dropped into the mixture over 2 hours, and the whole was stirred at 25° C. for 3 hours. After the stirring, 1.5 g of phosphoric acid and 1 mL of water were added to the resultant to terminate the reaction. Thus, 2,078.1 g of a reaction liquid was obtained. 126 Milliliters of water was added to the resultant reaction liquid, and the mixture was subjected to suction filtration to provide 2,195.2 g of a filtrate. 2,176.6 Grams out of the resultant filtrate was transferred to a 5-liter four-necked flask, and was concentrated under reduced pressure to provide 2,050.2 g of a colorless and transparent solution. The resultant colorless and transparent solution was added to 292 mL of toluene, and the mixture was concentrated under reduced pressure. 116 Milliliters of toluene was further added to the concentrate, and the mixture was subjected to azeotropic dehydration under reduced pressure to provide 1,671.5 g of a solid. 372.1 Grams of the resultant solid was collected, and 1,268.2 mL of toluene was added to 1,299.4 g of the remaining solid to provide 2,397.9 g of a reaction mixture. The total amount of the resultant reaction mixture was loaded into a 5-liter autoclave, and 316.4 g of NDT-65 (manufactured by Kawaken Fine Chemicals Co., Ltd.) and 231 mL of toluene were further added to the mixture, followed by the purging of the inside of the 5-liter autoclave with nitrogen. After the nitrogen purging, under room temperature, an ammonia gas was introduced to set a pressure in the 5-liter autoclave to 0.5 MPa, and hydrogen was further introduced to set the pressure to 3.0 MPa. Subsequently, the temperature in the autoclave was increased, and a reaction was performed for 3 hours under the conditions of a reaction liquid temperature of 80° C. and a reactor internal pressure of 4.4 MPa. After the reaction, the reaction liquid was cooled to room temperature, and the reactor internal pressure was reduced to normal pressure. 141 Milliliters of toluene and water were added to the resultant reaction liquid, and the reaction liquid was removed from the autoclave. 649 Milliliters of toluene and 35.0 g of pearlite were further added to the removed reaction liquid, and the mixture was filtered. The resultant filtrate was concentrated under reduced pressure to provide 1,218.7 g of a colorless and transparent liquid. A mixture obtained by adding 600 mL of water to the colorless and transparent liquid was concentrated under reduced pressure to provide 1,201.3 g of PEGPA-1,000 represented by the foregoing formula.

$^1$H-NMR (C$_6$D$_6$) δ (ppm): 3.49-3.29 (m, 90H), 2.66-2.60 (m, 4H), 1.57-1.54 (m, 4H)

(ii) Synthesis of Silylamine Compound H

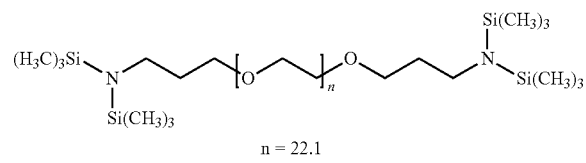

n = 22.1

31.7 Grams (29 mmol) of the PEGPA-1,000, 17.1 g (112 mmol) of 1,8-diazabicyclo[5.4.0]-7-undecene, and 140 mL of toluene were loaded into a 400-milliliter four-necked flask whose inside had been purged with nitrogen. 12.1 Grams (112 mmol) of chlorotrimethylsilane was dropped into the resultant reaction mixture, and then the whole was stirred at 25° C. for 48 hours. 25 Milliliters of tetrahydrofuran and 28 ml of methylene chloride were added to the reaction mixture, and the whole was stirred for 24 hours. 12.7 Grams (117 mmol) of chlorotrimethylsilane and 17.2 g (113 mmol) of 1,8-diazabicyclo[5.4.0]-7-undecene were further added to the resultant reaction mixture, and the whole was stirred at 25° C. for 24 hours. 16.7 Grams (282 mmol) of propylamine was dropped into the reaction mixture to terminate the reaction. A filtrate obtained by filtering the reaction mixture was concentrated under reduced pressure to provide 31.6 g of the silylamine compound H represented by the foregoing formula (yield: 78.6%). The $^1$H-NMR analysis results of the compound are described below. The $^1$H-NMR analysis results showed that in the foregoing formula, the polymerization degree "n" was 22.1 and an intramolecular oxygen atom number was 23.1.

$^1$H-NMR (C$_6$D$_6$) δ (ppm): 3.52-3.41 (m, 88H), 3.25-3.22 (m, 4H), 2.94-2.90 (m, 4H), 1.69-1.62 (m, 4H), 0.16 (s, 36H)

Example 9

Synthesis of Silylamine Compound I (i) Synthesis of PEGPA-1,500

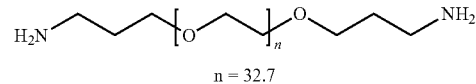

n = 32.7

480.2 Grams (320 mmol) of polyethylene glycol 1,500 (manufactured by Sigma-Aldrich) and 241 mL of water were loaded into a 2-liter four-necked flask whose inside had been purged with nitrogen, and the resultant mixture was heated. At the time point when the temperature of the mixture became 50° C., 0.5 g of a 48% aqueous solution of sodium hydroxide and 4.5 g of water were added to the mixture. The temperature of the mixture was kept at 50° C., and the mixture was stirred for 1 hour. After that, the mixture was cooled to 27° C. 51.2 Grams (965 mmol) of acrylonitrile was dropped into the mixture over 2 hours, and the whole was stirred at 25° C. for 16 hours. After the stirring, 0.7 g of phosphoric acid and 5 mL of water were added to the resultant to terminate the reaction, followed by stirring at 25° C. for 1.5 hours. 78 Milliliters of water was added to the resultant reaction mixture, and the whole was concentrated under reduced pressure. 101 Milliliters of toluene was added to the resultant mixture, and the whole was subjected to azeotropic dehydration under reduced pressure. 102 Milliliters of toluene was further added to the dehydrated product, and the mixture was subjected to azeotropic dehydration under reduced pressure again. 101 Milliliters of toluene was further added to the resultant mixture, and the whole was subjected to azeotropic dehydration under reduced pressure. 541 Milliliters of toluene was added to 532.8 g of the resultant mixture to provide 1,001.6 g of a concentrated liquid A.

470.2 Grams of the concentrated liquid A, 50.5 g of NDT-65 (manufactured by Kawaken Fine Chemicals Co., Ltd.), and 35 mL of toluene were loaded into a 1-liter autoclave, and the inside of the 1-liter autoclave was purged with nitrogen. After the nitrogen purging, under room temperature, an ammonia gas was introduced to set a pressure in the 1-liter autoclave to 0.5 MPa, and then hydrogen was introduced to set the pressure to 3.0 MPa. After that, the reactor was heated, and a reaction was performed for 3 hours under the conditions of a reaction liquid temperature of 80° C. and a pressure in the 1-liter autoclave of 4.4 MPa. After the reaction, the reaction liquid was cooled to room temperature, and the pressure in the 1-liter autoclave was reduced to normal pressure. 58 Milliliters of toluene was added to the reaction liquid to provide 599.2 g of a reaction liquid A. 607.0 Grams of a reaction liquid B was obtained from 470.2 g of the concentrated liquid A by the same method.

599.2 Grams of the reaction liquid A and 607.0 g of the reaction liquid B were added to 476 mL of toluene, and the resultant mixture was filtered under pressure to provide 1,647.8 g of a filtrate. 230 Milliliters of water was added to the resultant filtrate, and the mixture was concentrated under reduced pressure to provide 478.7 g of PEGPA-1,500 represented by the foregoing formula (yield: 92.6%).

$^1$H-NMR (C$_6$D$_6$) δ (ppm): 3.49-3.34 (m, 134H), 2.66-2.63 (m, 4H), 1.57-1.54 (m, 4H)

(ii) Synthesis of Silylamine Compound I

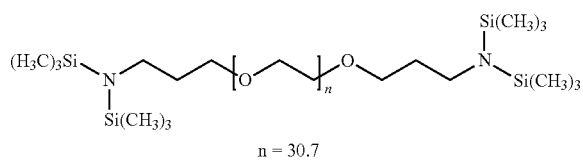

n = 30.7

30.2 Grams (19 mmol) of the PEGPA-1,500, 17.5 g (112 mmol) of 1,8-diazabicyclo[5.4.0]-7-undecene, and 134 mL of tetrahydrofuran were loaded into a 500-milliliter four-necked flask whose inside had been purged with nitrogen. 13.0 Grams (120 mmol) of chlorotrimethylsilane was dropped into the resultant reaction mixture, and then the whole was stirred at 25° C. for 24 hours. 4.2 Grams (28 mmol) of 1,8-diazabicyclo[5.4.0]-7-undecene and 3.1 g (29 mmol) of chlorotrimethylsilane were added to the resultant reaction mixture, and the whole was stirred at 25° C. for 6 hours. After that, 8.8 g (58 mmol) of 1,8-diazabicyclo [5.4.0]-7-undecene and 6.0 g (55 mmol) of chlorotrimethylsilane were added to the resultant, and the mixture was stirred at 25° C. for 16 hours. 4.1 Grams (70 mmol) of propylamine was dropped into the resultant reaction mixture to terminate the reaction. A filtrate obtained by filtering the reaction mixture was concentrated under reduced pressure to provide 33.1 g of the silylamine compound I represented by the foregoing formula (yield: 93.2%). The $^1$H-NMR analysis results of the compound showed that in the foregoing formula, the polymerization degree "n" was 30.7 and an intramolecular oxygen atom number was 31.7.

$^1$H-NMR (C$_6$D$_6$) δ (ppm): 3.53-3.16 (m, 127H), 2.97-2.93 (m, 4H), 1.72-1.65 (m, 4H), 0.18 (s, 36H)

Example 10

Synthesis of Silylamine Compound J
 (i) Synthesis of PEG 2,000-EtCN

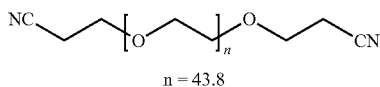

n = 43.8

1,493.3 Grams (747 mmol) of polyethylene glycol 2,000 (manufactured by FUJIFILM Wako Pure Chemical Corporation) and 747 mL of water were loaded into a 3-liter four-necked flask whose inside had been purged with nitrogen, and the resultant mixture was heated. At the time point when the temperature of the mixture became 43° C., 1.3 g of a 48% aqueous solution of sodium hydroxide and 1.3 g of water were added to the mixture. The temperature of the mixture was kept at 45° C., and the mixture was stirred for 1 hour. After that, the mixture was cooled to 20° C. 118.9 Grams (2,241 mmol) of acrylonitrile was dropped into the mixture over 2 hours, and the whole was stirred at 23° C. for 17 hours. 1.5 Grams of phosphoric acid and 2 mL of water were added to the resultant, and the mixture was stirred at 25° C. for 0.5 hour to terminate the reaction. 146 Milliliters of toluene was added to the resultant reaction mixture, and the whole was concentrated under reduced pressure. After that, 146 mL of toluene was added to the concentrate, and the mixture was concentrated under reduced pressure. 146 Milliliters of toluene was added to the resultant concentrated liquid again, and the mixture was concentrated under reduced pressure to provide 1,669.5 g of PEG 2,000-EtCN.

$^1$H-NMR (C$_6$D$_6$) δ (ppm): 3.69-3.24 (m, 179H), 3.09-3.06 (m, 4H), 1.84-1.81 (m, 4H)

(ii) Synthesis of PEGPA-2,000

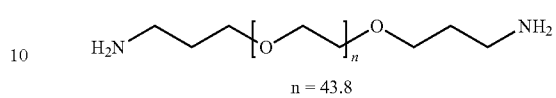

n = 43.8

1,302.5 Grams of the PEG 2,000-EtCN obtained in the foregoing, 1,500 mL of toluene, and 260.0 g of NDT-65 (manufactured by Kawaken Fine Chemicals Co., Ltd.) were loaded into a 5-liter autoclave, and the inside of the 5-liter autoclave was purged with nitrogen. After the nitrogen purging, under room temperature, an ammonia gas was introduced to set a pressure in the 5-liter autoclave to 0.5 MPa, and then hydrogen was further introduced to set the pressure to 3.0 MPa. Subsequently, the temperature in the autoclave was increased, and a reaction was performed for 3 hours under the conditions of a reaction liquid temperature of 80° C. and a reactor internal pressure of 4.5 MPa. After the reaction, the reaction liquid was cooled to room temperature, and the reactor internal pressure was reduced to normal pressure. 878 Milliliters of toluene was added to the resultant reaction mixture, and a newly obtained reaction mixture was filtered under pressure to provide 3,177.5 g of a filtrate. 599 Milliliters of water was added to the resultant filtrate, and the mixture was concentrated under reduced pressure to provide 1,219.6 g of PEGPA-2,000 represented by the foregoing formula (yield: 99.0%).

$^1$H-NMR (C$_6$D$_6$) δ (ppm): 3.66-3.35 (m, 179H), 2.66-2.63 (m, 4H), 1.57-1.54 (m, 4H)

(iii) Synthesis of Silylamine Compound J

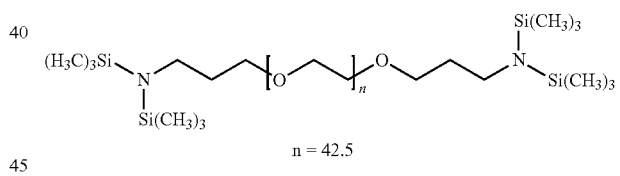

n = 42.5

30.0 Grams (14 mmol) of the PEGPA-2,000, 14.0 g (92 mmol) of 1,8-diazabicyclo[5.4.0]-7-undecene, and 139 mL of toluene were loaded into a 500-milliliter four-necked flask whose inside had been purged with nitrogen. 10.0 Grams (92 mmol) of chlorotrimethylsilane was dropped into the resultant reaction mixture, and then the whole was stirred at 25° C. for 24 hours. 21 Milliliters of methylene chloride was added to the resultant reaction mixture, and the whole was stirred at 25° C. for 24 hours. 7.1 Grams (47 mmol) of 1,8-diazabicyclo[5.4.0]-7-undecene and 4.9 g (46 mmol) of chlorotrimethylsilane were added thereto, and the whole was further stirred at 25° C. for 96 hours. 10.0 Grams (169 mmol) of propylamine was dropped into the resultant reaction mixture to terminate the reaction. A filtrate obtained by filtering the reaction mixture was concentrated under reduced pressure to provide 27.1 g of the silylamine compound J represented by the foregoing formula (yield: 79.6%). The $^1$H-NMR analysis results of the compound showed that in the foregoing formula, the polymerization degree "n" was 42.5 and an intramolecular oxygen atom number was 43.5.

$^1$H-NMR (C$_6$D$_6$) δ (ppm): 3.65-3.42 (m, 174H), 2.95-2.91 (m, 4H), 1.68-1.64 (m, 4H)

Production Example 1

Synthesis of Silylamine Compound K

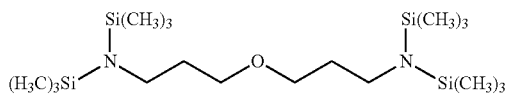

9.8 Grams (74 mmol) of 4-oxa-1,7-heptanediamine, 47.0 g (309 mmol) of 1,8-diazabicyclo[5.4.0]-7-undecene, and 127 mL of acetonitrile were loaded into a 500-milliliter four-necked flask whose inside had been purged with nitrogen. The resultant mixture was cooled to 10° C. or less, and 33.6 g (309 mmol) of chlorotrimethylsilane was dropped into the mixture. After that, the reaction mixture was stirred at 25° C. for 23 hours. The reaction mixture was subjected to an extraction operation with 50 mL of heptane four times. The heptane layer was concentrated under reduced pressure, and was then filtered under nitrogen to provide 22.4 g of a silylamine compound K represented by the foregoing formula (yield: 71.0%). The $^1$H-NMR analysis results of the compound are described below.

$^1$H-NMR (C$_6$D$_6$) δ (ppm): 3.20-3.17 (m, 4H), 3.01-2.97 (m, 4H), 1.71-1.67 (m, 4H), 0.20 (s, 36H)

Production Example 2

Synthesis of Silylamine Compound L

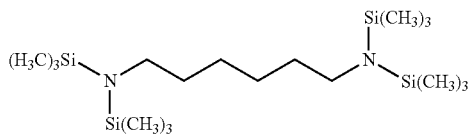

10.0 Grams (86 mmol) of hexamethylenediamine, 42.7 g of 1,5-diazabicyclo[4.3.0]-5-nonene, and 39 mL of acetonitrile were loaded into a 400-milliliter four-necked flask whose inside had been purged with nitrogen. The resultant mixture was cooled to 10° C. or less, and 37.2 g (342 mmol) of chlorotrimethylsilane was dropped into the mixture. After that, the reaction mixture was stirred at 25° C. for 17 hours. The reaction mixture was subjected to an extraction operation with 50 mL of heptane three times. The heptane layer was concentrated under reduced pressure to provide 28.6 g of a silylamine compound L represented by the foregoing formula (yield: 82.1%). The $^1$H-NMR analysis results of the compound are described below.

$^1$H-NMR (C$_6$D$_6$) δ (ppm): 2.80-2.75 (m, 4H), 1.33-1.17 (m, 8H), 0.19 (s, 36H)

Production Example 3

Synthesis of Oxazolidine-Based Latent Curing Agent

While a nitrogen gas was flowed into a reaction vessel equipped with a stirrer, a thermometer, a nitrogen seal tube, an ester tube, and a heating and cooling device, 420 g of diethanolamine (molecular weight: 105), 177 g of toluene, and 317 g of isobutyraldehyde (molecular weight: 72.1) were loaded into the vessel. The mixture was heated with stirring and subjected to a reflux dehydration reaction at from 110° C. to 150° C. while removing water (71.9 g) generated as a by-product out of the system. After no distillation of water came to be recognized, the resultant was further heated under reduced pressure (50 hPa to 70 hPa) to remove toluene and unreacted isobutyraldehyde, to thereby obtain N-hydroxyethyl-2-isopropyloxazolidine as an intermediate reaction product. Then, 336 g of hexamethylene diisocyanate (molecular weight: 168) was added to 636 g of the obtained N-hydroxyethyl-2-isopropyloxazolidine, and the mixture was heated at 80° C. for 8 hours. When an NCO content actually measured by titration reached 0.0 mass %, the reaction was finished to obtain an oxazolidine-based latent curing agent having two oxazolidine rings in one molecule. The obtained oxazolidine-based latent curing agent was a liquid at normal temperature.

Production Example 4

Synthesis of Isocyanate Group-Containing Urethane Prepolymer

While a nitrogen gas was flowed into a reaction vessel equipped with a stirrer, a thermometer, a nitrogen seal tube, and a heating and cooling device, 421.5 g of polyoxypropylene diol (product name: SANNIX PP-4000, manufactured by Sanyo Chemical Industries, Ltd., number average molecular weight: 5,570, dispersity Mw/Mn: 1.02), 421.5 g of polyoxypropylene triol (product name: EXCENOL 5030F, manufactured by AGC Inc., number average molecular weight: 5,140, dispersity Mw/Mn: 1.02), and 0.05 g of 2-ethylhexyl acid phosphate (product name: JP-508, manufactured by Johoku Chemical Co., Ltd.) were loaded into the vessel. While the mixture was stirred, 156.7 g of isophorone diisocyanate (molecular weight: 222.3, manufactured by Evonik Japan Co., Ltd.) and 0.3 g of zirconyl 2-ethylhexanoate (product name: NIKKA OCTHIX ZIRCONIUM 12%, manufactured by Nihon Kagaku Sangyo Co., Ltd.) were further added to the mixture. The resultant was warmed, and was subjected to a reaction at from 80° C. to 85° C. for 2 hours. At the time point when the isocyanate group content of the reaction product became equal to or less than a theoretical value (4.0 mass %), the reaction was terminated. Thus, an isocyanate group-containing urethane prepolymer was synthesized.

Example 11

Storage Stability Test

Under a nitrogen atmosphere, the silylamine compound A or the silylamine compound L serving as a latent curing agent, and isophorone diisocyanate and trifluoroacetic acid were loaded into a test tube according to composition shown in Table 1, and were stirred and mixed until the mixture became uniform. Thus, a curable composition was prepared.

Under a nitrogen atmosphere, the curable composition was sealed and stored at 25° C. At the time point when 0 days, 1 day, 4 days, 6 days, or 12 days elapsed from the beginning of the storage, the test tube containing the curable composition was inverted, and the flowability of the sample was evaluated based on the following evaluation criteria through visual observation. The results are shown in Table 1.

A: The composition flowed by 1 cm within 15 seconds after the inversion of the test tube.
B: The composition flowed by 1 cm within 1 minute after the inversion of the test tube.
C: The composition did not flow even after the lapse of 1 minute from the inversion of the test tube.

TABLE 1

| Latent curing agent | Composition | | | Flowability Storage period (day(s)) | | | | |
|---|---|---|---|---|---|---|---|---|
| | Isophorone diisocyanate (g) | Latent curing agent (g) | Trifluoroacetic acid (g) | 0 | 1 | 4 | 6 | 12 |
| Silylamine compound A | 2.04 | 4.43 | 0.01 | A | A | A | A | A |
| Silylamine compound L | 2.04 | 3.64 | 0.01 | A | B | C | C | C |

As shown in Table 1, the curable composition containing the silylamine compound A as its latent curing agent showed excellent storage stability because the flowability of the curable composition was satisfactory even at the time point when 12 days elapsed from the beginning of the storage.

Example 12

Curing Performance Evaluation Test

The curable composition prepared in Example [1]11 by using the silylamine compound A as its latent curing agent was sealed and stored under a nitrogen atmosphere at 25° C. for 1 day. The curable composition after the storage was opened under air, and its tack-free time was measured at a temperature of 16° C. and a humidity of 40% RH. As a result, the tack-free time was 6 hours.

Examples 13 to 19 and Comparative Example 1

Curing Test

The isocyanate group-containing urethane prepolymer produced in Production Example 4, a latent curing agent shown in Table 2, and butoxyethyl acid phosphate (product name: JP-506H, manufactured by Johoku Chemical Co., Ltd.) were blended in a test tube according to composition shown in Table 2, and were stirred and mixed until the mixture became uniform. Thus, a curable composition was produced. The curable composition was opened under air, and its tack-free time was measured at a temperature of 16° C. and a humidity of 40% RH. The results are shown in Table 2. A tack-free time of 96.0 or more in Comparative Example 1 means that the composition did not cure even after the lapse of 96.0 hours.

TABLE 2

| Example | Composition | | | | | Tack-free time (hr) |
|---|---|---|---|---|---|---|
| | Latent curing agent | Urethane prepolymer (g) | Latent curing agent (g) | (Molar ratio*) | JP-506H (g) | |
| Example 13 | Silylamine compound A | 5 | 1.12 | 1 | 0.013 | 4.5 |
| Example 14 | Silylamine compound B | 5 | 0.99 | 1 | 0.013 | 9.5 |
| Example 15 | Silylamine compound C | 5 | 1.05 | 1 | 0.013 | 4.5 |
| Example 16 | Silylamine compound D | 5 | 1.15 | 1 | 0.013 | 4.5 |
| Example 17 | Silylamine compound E | 5 | 2.03 | 1 | 0.013 | 23 |
| Example 18 | Silylamine compound F | 5 | 2.31 | 1 | 0.013 | 24 |
| Example 19 | Silylamine compound G | 5 | 2.60 | 1 | 0.013 | 48 |
| Example 20 | Silylamine compound H | 5 | 3.04 | 1 | 0.013 | 48 |
| Comparative Example 1 | None | 5 | 0 | 0 | 0.013 | 96.0 or more |

*Molar ratio: The molar ratio of an amino group produced by the hydrolysis of the latent curing agent with respect to 1 mol of an isocyanate group in the isocyanate group-containing urethane prepolymer Examples 21 to 27, and Reference Examples 1 and 2

Storage Stability Test

The isocyanate group-containing urethane prepolymer produced in Production Example 4, a latent curing agent shown in Table 3, and butoxyethyl acid phosphate (product name: JP-506H, manufactured by Johoku Chemical Co., Ltd.) were blended in a test tube according to composition shown in Table 3, and were stirred and mixed until the mixture became uniform. Thus, a curable composition was produced. The curable composition was stored in a closed system at 50° C. for 5 days, and then its viscosity was measured, followed by the evaluation of its storage stability from the measured value based on the following three-stage evaluation criteria. The viscosity was measured with EMS-1000 manufactured by Kyoto Electronics Manufacturing Co., Ltd. at 25° C. The results are shown in Table 3.

A: The viscosity was less than 15,000 mPa·s 5 days after the storage.

B: The viscosity was less than 35,000 mPa·s 5 days after the storage.

C: The viscosity was 35,000 mPa·s or more 5 days after the storage.

D: The viscosity could not be measured because a solid was present in the curable composition (the silylamine compound was not dissolved).

Odor Judgment Test

After the completion of the storage stability test, the upper portion of the test tube containing the curable composition was fanned with a hand, and an odor was identified with the olfactory sense of an experimenter, and was evaluated based on the following three-stage evaluation criteria. The results are shown in Table 3.

A: No aldehyde odor is felt when the opened test tube is held.

B: An aldehyde odor is felt when the opened test tube is held.

C: An aldehyde odor is strongly felt when the opened test tube is held.

TABLE 3

| Example | Latent curing agent | Intramolecular oxygen atom number | Urethane prepolymer (g) | Latent curing agent (g) | (Molar ratio*) | J-506H (g) | Viscosity before test (mPa·s) | Storage stability | Odor |
|---|---|---|---|---|---|---|---|---|---|
| Example 21 | Silylamine compound A | 2 | 5 | 1.12 | 1 | 0.013 | 2,200 | A | A |
| Example 22 | Silylamine compound B | 2 | 5 | 1.04 | 1 | 0.013 | 2,960 | A | A |
| Example 23 | Silylamine compound C | 2 | 5 | 1.11 | 1 | 0.013 | 4,240 | A | A |
| Example 24 | Silylamine compound D | 3 | 5 | 1.15 | 1 | 0.013 | 2,250 | A | A |
| Example 25 | Silylamine compound E | 12 | 5 | 2.03 | 1 | 0.013 | 1,680 | A | A |
| Example 26 | Silylamine compound G | 17.5 | 5 | 2.60 | 1 | 0.013 | 2,560 | A | A |
| Example 27 | Silylamine compound H | 23.1 | 5 | 3.04 | 1 | 0.013 | 1,330 | A | A |
| Reference Example 1 | Silylamine compound I | 31.7 | 5 | 4.01 | 1 | 0.013 | — | D | — |
| Reference Example 2 | Silylamine compound J | 43.5 | 5 | 5.28 | 1 | 0.013 | — | D | — |

*Molar ratio: The molar ratio of an amino group produced by the hydrolysis of the latent curing agent with respect to 1 mol of an isocyanate group in the isocyanate group-containing urethane prepolymer Comparative Example 2

Odor Judgment Test 5.000 Grams of the isocyanate group-containing urethane prepolymer produced in Production Example 4, 0.9641 g of the oxazolidine-based latent curing agent produced in Production Example 3, and 0.013 g of butoxyethyl acid phosphate (product name: JP-506H, manufactured by Johoku Chemical Co., Ltd.) were blended in a test tube, and were stirred and mixed until the mixture became uniform. Thus, a curable composition was produced. The odor of the produced curable composition was evaluated in the same manner as in the odor judgment test in each of Examples 21 to 27, and Reference Examples 1 and 2. As a result, the evaluation of the judgment test of the curable composition was C.

Comparative Example 3

5.000 Grams of the isocyanate group-containing urethane prepolymer produced in Production Example 4, 0.952 g of the silylamine compound L, and 0.013 g of butoxyethyl acid phosphate (product name: JP-506H, manufactured by Johoku Chemical Co., Ltd.) were blended in a test tube, and were stirred and mixed until the mixture became uniform. Thus, a curable composition was produced. The curable composition was stored in a closed system at 50° C. for 5 hours, and then its viscosity was measured. The viscosity was measured with EMS-1000 manufactured by Kyoto Electronics Manufacturing Co., Ltd. at 25° C. The viscosity of the curable composition immediately after the production was 31,700 mPa·s, and the viscosity of the curable composition after having been stored for 5 hours was 66,300 mPa·s.

Examples 28 to 35, Reference Examples 3 and 4, and Comparative Examples 4 to 6

Compatibility Test 2.0 Grams of the isocyanate group-containing urethane prepolymer produced in Production Example 4 and 1.0 g of a latent curing agent shown in Table 4 were blended in a test tube, and were stirred and mixed until the mixture became uniform. Thus, a curable composition was produced. Compounds in the resultant curable composition were inverted and mingled (60 times/min) at 25° C., and compatibility therebetween at each elapsed time was evaluated based on the following evaluation criteria through visual observation.

A: The compounds are completely mingled with each other.

B: The compounds are not completely compatible with each other, though an interface therebetween is unclear.

C: The compounds are clearly separated from each other.

D: A solid is present in the curable composition (the silylamine compound is not dissolved).

TABLE 4

| Example | Latent curing agent | Intramolecular oxygen atom number | Compatibility Elapsed time | | |
|---|---|---|---|---|---|
| | | | 2 minutes | 5 minutes | 10 minutes |
| Example 28 | Silylamine compound A | 2 | A | A | A |
| Example 29 | Silylamine compound B | 2 | A | A | A |
| Example 30 | Silylamine compound C | 2 | A | A | A |
| Example 31 | Silylamine compound D | 3 | A | A | A |
| Example 32 | Silylamine compound E | 12 | A | A | A |
| Example 33 | Silylamine compound F | 14.9 | A | A | A |
| Example 34 | Silylamine compound G | 17.5 | A | A | A |
| Example 35 | Silylamine compound H | 23.1 | B | B | A |
| Reference Example 3 | Silylamine compound I | 31.7 | D | D | D |
| Reference Example 4 | Silylamine compound J | 43.5 | D | D | D |

TABLE 4-continued

| Example | Latent curing agent | Intramolecular oxygen atom number | Compatibility Elapsed time | | |
|---|---|---|---|---|---|
| | | | 2 minutes | 5 minutes | 10 minutes |
| Comparative Example 4 | Oxazolidine-based latent curing agent* | — | C | C | C |
| Comparative Example 5 | Silylamine compound K | 1 | C | B | B |
| Comparative Example 6 | Silylamine compound L | 0 | C | C | C |

*Oxazolidine-based latent curing agent: The oxazolidine-based latent curing agent produced in Production Example 3

The result of Example 12 showed that the composition produced from the silylamine compound of the present invention and the isocyanate monomer showed curing performance. In addition, the results shown in Table 2 showed that the compositions each produced from the silylamine compound of the present invention and the isocyanate group-containing urethane prepolymer each showed curing performance.

The results shown in Table 3 showed that each of the curable compositions each containing the silylamine compound of the present invention was excellent in storage stability, and did not emit an aldehyde odor. Meanwhile, the result of Comparative Example 2 showed that the oxazolidine-based curing agent emitted an aldehyde odor. Further, the results shown in Table 4 showed that the latent curing agents each containing the silylamine compound of the present invention were each excellent in compatibility with the isocyanate compound (isocyanate group-containing urethane prepolymer). Meanwhile, the results of Comparative Example 3 and Comparative Example 6 showed that each of the curable compositions each using the silylamine compound L free of any ethereal oxygen atom in a molecule thereof had a high initial viscosity and poor storage stability, and moreover, was poor in compatibility with the isocyanate compound (isocyanate group-containing urethane prepolymer). In addition, the results of Comparative Example 4 showed that the oxazolidine-based latent curing agent was poor in compatibility. The results of Comparative Example 5 showed that the silylamine compound K having an intramolecular oxygen atom number of 1 had insufficient compatibility with the isocyanate compound (isocyanate group-containing urethane prepolymer).

The results of Tables 1 to 4 showed that the silylamine compound of the present invention was useful as a latent curing agent for a curable composition containing an isocyanate compound. In addition, as is apparent from its structure, the silylamine compound of the present invention is useful because the compound does not produce an aldehyde compound even when hydrolyzed by water such as moisture, and hence does not produce the odor of the aldehyde compound when caused to react with the isocyanate compound.

This application claims the benefit of priority from Japanese Patent Application Nos. 2018-205205 and 2018-205211, filed on Oct. 31, 2018, the contents of which are incorporated herein by reference.

The invention claimed is:

1. A silylamine compound represented by the following formula (1):

Formula (1):

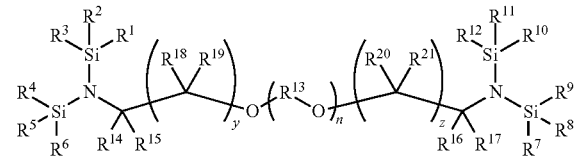

(1)

in the formula (1), $R^1$ to $R^{12}$ each independently represent a methyl group or ethyl group, $R^{13}$ represents an ethylene group, a propylene group or a butylene group, $R^{14}$ to $R^{21}$ represent a hydrogen atom, "y" and "z" are the same and represent an integer of 1 or 2, and "n" represents an integer of from 1 to 22.

2. The silylamine compound according to claim 1, wherein "n" represents from 1 to 5.

3. The silylamine compound according to claim 1, wherein $R^1$ to $R^{12}$ are methyl groups.

4. The silylamine compound according to claim 1, wherein $R^{13}$ represents an ethylene group or a butylene group.

5. A latent curing agent comprising a silylamine compound represented by the following formula (1):

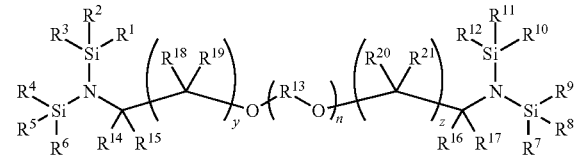

(1)

in the formula (1), $R^1$ to $R^{12}$ each independently represent a methyl group or an ethyl group, $R^{13}$ represents an ethylene group, a propylene group or a butylene group, $R^{14}$ to $R^{21}$ represent a hydrogen atom, "y" and "z" are the same and represent an integer of 1 or 2, and "n" represents an integer of from 1 to 22.

6. The latent curing agent according to claim 5, wherein "n" represents from 1 to 5.

7. The latent curing agent according to claim 5, wherein $R^1$ to $R_{12}$ are methyl groups.

8. The latent curing agent according to claim 5, wherein $R^{13}$ represents an ethylene group or a butylene group.

9. A curable composition comprising:
a latent curing agent comprising a silylamine compound represented by the following formula (1):

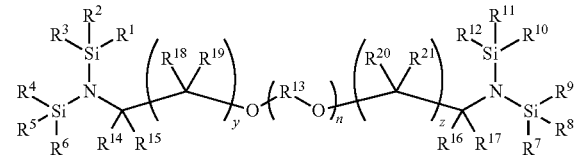

(1)

in the formula (1), $R^1$ to $R^{12}$ each independently represent a methyl group or an ethyl group, $R^{13}$ represents an ethylene group, a propylene group or a butylene group, $R^{14}$ to $R_{21}$ represent a hydrogen atom, "y" and "z" each independently represent an integer of 1 or 2, and "n" represents an integer of from 1 to 22; and an isocyanate compound.

10. A curable composition comprising:

a latent curing agent comprising a silylamine compound represented by the following formula (1):

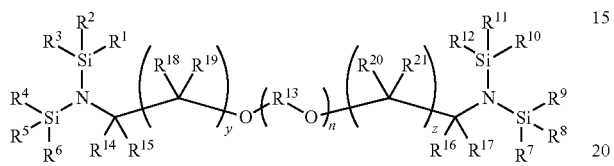

(1)

in the formula (1), $R^1$ to $R^{12}$ each independently represent a methyl group or an ethyl group, $R^{13}$ represents an ethylene group, a propylene group or a butylene group, $R^{14}$ to $R^{21}$ represent a hydrogen atom, "y" and "z" each independently represent an integer of 1 or 2, and "n" represents an integer of from 1 to 22;

an isocyanate compound; and an acidic compound.

11. A method for using a silylamine compound represented by the following formula (1) as a latent curing agent:

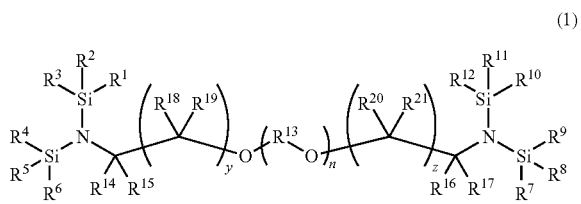

(1)

in the formula (1), $R^1$ to $R^{12}$ each independently represent a methyl group or an ethyl group, $R^{13}$ represents an ethylene group, a propylene group or a butylene group, $R^{14}$ to $R^{21}$ represent a hydrogen atom, "y" and "z" each independently represent an integer of 1 or 2, and "n" represents an integer of from 1 to 22, comprising:

reacting the silylamine compound with an isocyanate compound.

* * * * *